United States Patent
Bharatia et al.

(10) Patent No.: US 11,224,093 B2
(45) Date of Patent: Jan. 11, 2022

(54) NETWORK INITIATED UPF SESSIONS TRANSFER

(71) Applicants: Jayshree Bharatia, Plano, TX (US); Esmael Dinan, McLean, VA (US); Kyungmin Park, Herndon, VA (US); Peyman Talebi Fard, Sterling, VA (US); Weihua Qiao, Herndon, VA (US)

(72) Inventors: Jayshree Bharatia, Plano, TX (US); Esmael Dinan, McLean, VA (US); Kyungmin Park, Herndon, VA (US); Peyman Talebi Fard, Sterling, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 39 days.

(21) Appl. No.: 16/538,187

(22) Filed: Aug. 12, 2019

(65) Prior Publication Data
US 2020/0053828 A1 Feb. 13, 2020

Related U.S. Application Data

(60) Provisional application No. 62/718,326, filed on Aug. 13, 2018.

(51) Int. Cl.
*H04W 80/10* (2009.01)
*H04W 80/12* (2009.01)
(Continued)

(52) U.S. Cl.
CPC ........... *H04W 80/10* (2013.01); *H04W 48/18* (2013.01); *H04W 68/005* (2013.01);
(Continued)

(58) Field of Classification Search
CPC ... H04W 80/10; H04W 80/12; H04W 68/005; H04W 76/12; H04W 48/18; H04W 76/11;
(Continued)

(56) References Cited

U.S. PATENT DOCUMENTS 10,412,625 B1 * 9/2019 Yan ..................... H04L 12/1403
2018/0198867 A1 * 7/2018 Dao ........................ H04L 67/14
(Continued)

OTHER PUBLICATIONS

3GPP TS 23.401 V16.2.0 (Mar. 2019); 3rd Generation Partnership Project; Technical Specification Group Services and System Aspects; General Packet Radio Service (GPRS) enhancements for Evolved Universal Terrestrial Radio Access Network; (E-UTRAN) access; (Release 16).
(Continued)

*Primary Examiner* — Hoang-Chuong Q Vu
(74) *Attorney, Agent, or Firm* — Sachin T. Kandhari; Philip R. Smith; Jacob L. Mangan

(57) ABSTRACT

A SMF receives from a first UPF, first message(s) indicating a status of the first UPF. The SMF determines, based on the status, to transfer sessions for a group of wireless devices from the first UPF to a second UPF. The SMF sends to the second UPF, a second message indicating an establishment request of sessions for the group of wireless devices. The second message comprises session identifiers of the sessions. The SMF receives from the second UPF, a third message indicating a result of the establishment request. The SMF sends to the first UPF, based on the result, a fourth message indicating release of session(s) of the sessions. The fourth message comprises session identifier(s) of the session(s).

20 Claims, 25 Drawing Sheets

(51) Int. Cl.
*H04W 68/00* (2009.01)
*H04W 76/30* (2018.01)
*H04W 48/18* (2009.01)
*H04W 76/11* (2018.01)
*H04W 76/12* (2018.01)

(52) U.S. Cl.
CPC ............ *H04W 76/11* (2018.02); *H04W 76/12* (2018.02); *H04W 76/30* (2018.02); *H04W 80/12* (2013.01)

(58) Field of Classification Search
CPC ..... H04W 76/30; H04W 92/24; H04W 88/14; H04W 76/22
See application file for complete search history.

(56) References Cited

U.S. PATENT DOCUMENTS

| | | | | |
|---|---|---|---|---|
| 2018/0270782 | A1* | 9/2018 | Park | H04W 8/02 |
| 2018/0324646 | A1* | 11/2018 | Lee | H04W 36/0016 |
| 2019/0007500 | A1* | 1/2019 | Kim | H04L 67/141 |
| 2019/0007992 | A1* | 1/2019 | Kim | H04W 64/006 |
| 2019/0090164 | A1* | 3/2019 | Ding | H04L 29/08 |
| 2019/0098536 | A1* | 3/2019 | Qiao | H04W 36/0016 |
| 2019/0166467 | A1* | 5/2019 | Livanos | H04W 76/12 |
| 2019/0174449 | A1* | 6/2019 | Shan | H04W 60/04 |
| 2019/0253917 | A1* | 8/2019 | Dao | H04M 15/8228 |
| 2019/0254094 | A1* | 8/2019 | Babu | H04W 76/15 |
| 2019/0349340 | A1* | 11/2019 | Zhang | H04L 63/0428 |
| 2020/0068587 | A1* | 2/2020 | Garcia Azorero | H04L 67/32 |
| 2020/0100095 | A1* | 3/2020 | Tang | H04W 80/10 |
| 2020/0120549 | A1* | 4/2020 | Sun | H04W 36/18 |
| 2020/0120570 | A1* | 4/2020 | Youn | H04W 36/0033 |
| 2020/0128505 | A1* | 4/2020 | Lu | H04W 76/15 |
| 2020/0169639 | A1* | 5/2020 | Chai | H04L 12/1407 |
| 2020/0296653 | A1* | 9/2020 | Huang | H04W 40/24 |
| 2020/0366794 | A1* | 11/2020 | Lee | H04L 12/1403 |
| 2020/0382941 | A1* | 12/2020 | Lee | H04W 76/27 |
| 2020/0404729 | A1* | 12/2020 | Mildh | H04W 76/27 |
| 2021/0211960 | A1* | 7/2021 | Ryu | H04W 36/14 |

OTHER PUBLICATIONS

3GPP TS 23.501 V15.2.0 (Jun. 2018); 3rd Generation Partnership Project; Technical Specification Group Services and System Aspects; System Architecture for the 5G System; Stage 2; (Release 15).

3GPP TS 23.502 V15.2.0 (Jun. 2018); 3rd Generation Partnership Project; Technical Specification Group Services and System Aspects; Procedures for the 5G System; Stage 2 (Release 15).

3GPP TS 29.244 V15.2.0 (Jun. 2018) Technical Specification; 3rd Generation Partnership Project Technical Specification Group Core Network and Terminals; Interface between the Control Plane and the User Plane Nodes; Stage 3 (Release 15).

3GPP TS 29.281 V15.5.0 (Dec. 2018); 3rd Generation Partnership Project; Technical Specification Group Core Network and Terminals; General Packet Radio System (GPRS) Tunnelling Protocol User Plane (GTPv1-U) (Release 15).

3GPP TR 29.807 V12.0.0 (Jun. 2014); 3rd Generation Partnership Project; Technical Specification Group Core Network and Terminals; Study on General Packet Radio Service (GPRS) Tunnelling Protocol for Control plane (GTP-C) overload control mechanisms (Release 12).

3GPP TR 29.890 V15.2.0 (Jun. 2018); 3rd Generation Partnership Project; Technical Specification Group Core Network and Terminals; Study on CT WG3 Aspects of 5G System Phase 1; (Release 15).

SA WG2 Meeting #128 S2-1875116440; Jul. 2-6, 2018, Vilnius, Lithuania; Source: AT&T, Sprint; Title: An addition to Key Issue 2; Document for: Decision; Agenda Item: 6.19; Work Item / Release: eSBA / Rel-16.

* cited by examiner

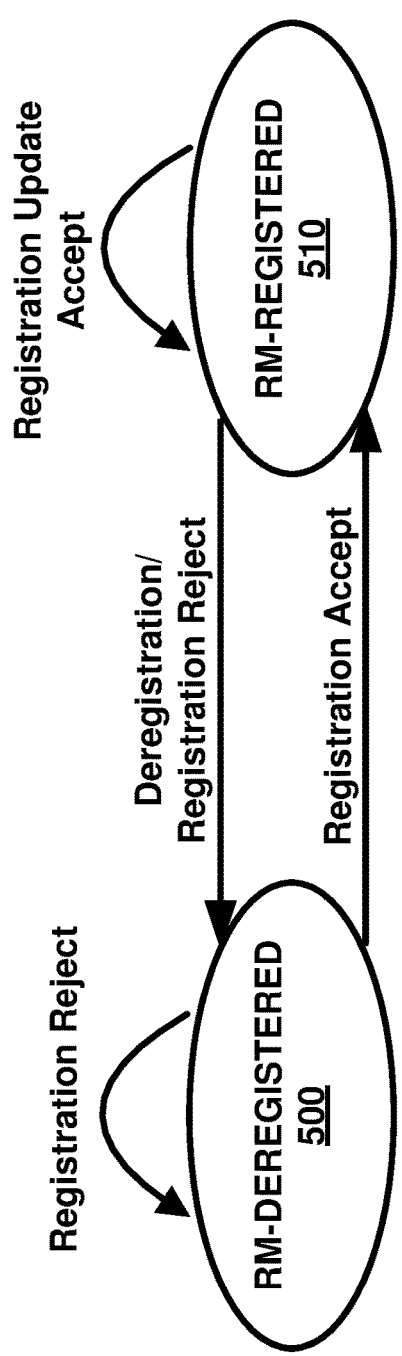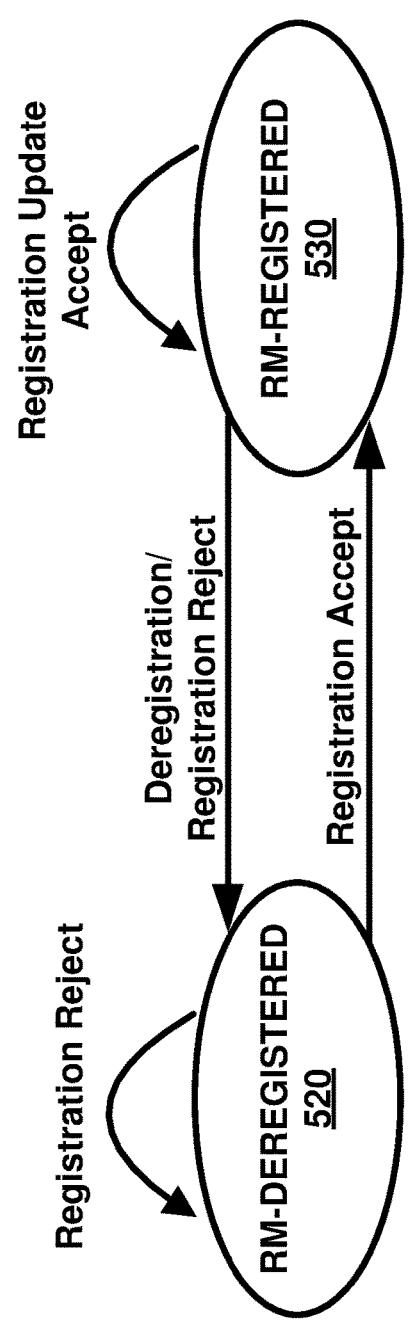
FIG. 5A — RM State Transition in UE
FIG. 5B — RM State Transition in AMF

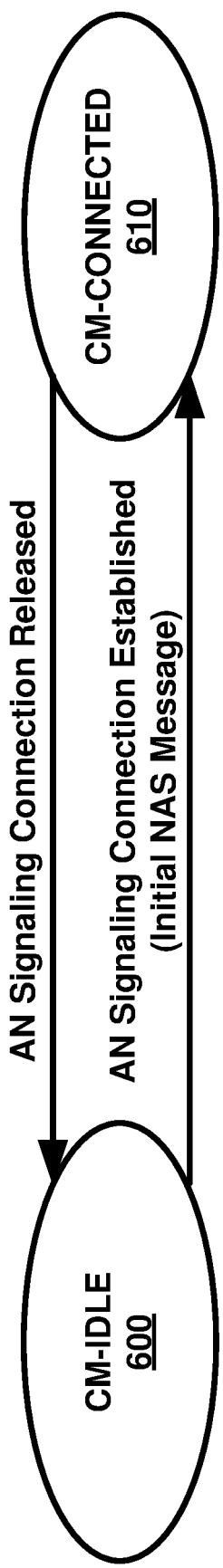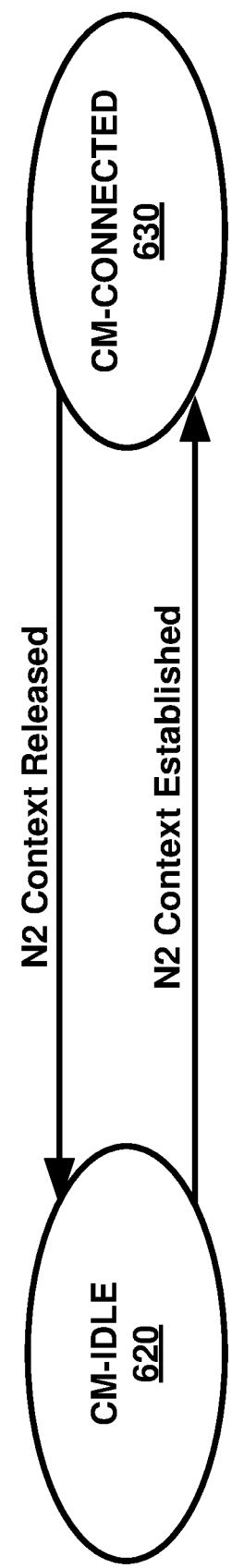

NETWORK INITIATED UPF SESSIONS TRANSFER

CROSS-REFERENCE TO RELATED APPLICATIONS

This application claims the benefit of U.S. Provisional Application No. 62/718,326, filed Aug. 13, 2018, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 18 is an example call flow diagram for the scenario depicted in FIG. 17.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

| | |
|---|---|
| 5G | 5th generation mobile networks |
| 5GC | 5G Core Network |
| 5GS | 5G System |
| 5G-AN | 5G Access Network |
| 5QI | 5G QoS Indicator |
| ACK | Acknowledgement |
| AF | Application Function |
| AMF | Access and Mobility Management Function |
| AN | Access Network |
| CDR | Charging Data Record |
| CCNF | Common Control Network Functions |
| CIoT | Cellular IoT |
| CN | Core Network |
| CP | Control Plane |
| DDN | Downlink Data Notification |
| DL | Downlink |
| DN | Data Network |
| DNN | Data Network Name |
| F-TEID | Fully Qualified TEID |
| GPSI | Generic Public Subscription Identifier |
| GTP | GPRS Tunneling Protocol |
| GUTI | Globally Unique Temporary Identifier |
| IMSI | International Mobile Subscriber Identity |
| LADN | Local Area Data Network |
| LI | Lawful Intercept |
| MEI | Mobile Equipment Identifier |
| MICO | Mobile Initiated Connection Only |
| MME | Mobility Management Entity |

| | |
|---|---|
| MO | Mobile Originated |
| MSISDN | Mobile Subscriber ISDN |
| MT | Mobile Terminating |
| N3IWF | Non-3GPP InterWorking Function |
| NAI | Network Access Identifier |
| NAS | Non-Access Stratum |
| NB-IoT | Narrow Band IoT |
| NEF | Network Exposure Function |
| NF | Network Function |
| NGAP | Next Generation Application Protocol |
| NR | New Radio |
| NRF | Network Repository Function |
| NSI | Network Slice Instance |
| NSSAI | Network Slice Selection Assistance Information |
| NSSF | Network Slice Selection Function |
| OCS | Online Charging System |
| OFCS | Offline Charging System |
| PCF | Policy Control Function |
| PDU | Packet/Protocol Data Unit |
| PEI | Permanent Equipment Identifier |
| PLMN | Public Land Mobile Network |
| RAN | Radio Access Network |
| QFI | QoS Flow Identity |
| RM | Registration Management |
| S1-AP | S1 Application Protocol |
| SBA | Service Based Architecture |
| SEA | Security Anchor Function |
| SCM | Security Context Management |
| SMF | Session Management Function |
| SMSF | SMS Function |
| S-NSSAI | Single Network Slice Selection Assistance information |
| SUCI | Served User Correlation ID |
| SUPI | Subscriber Permanent Identifier |
| TEID | Tunnel Endpoint Identifier |
| UDM | Unified Data Management |
| UE | User Equipment |
| UL | Uplink |
| UL CL | Uplink Classifier |
| UPF | User Plane Function |

Figure 1:
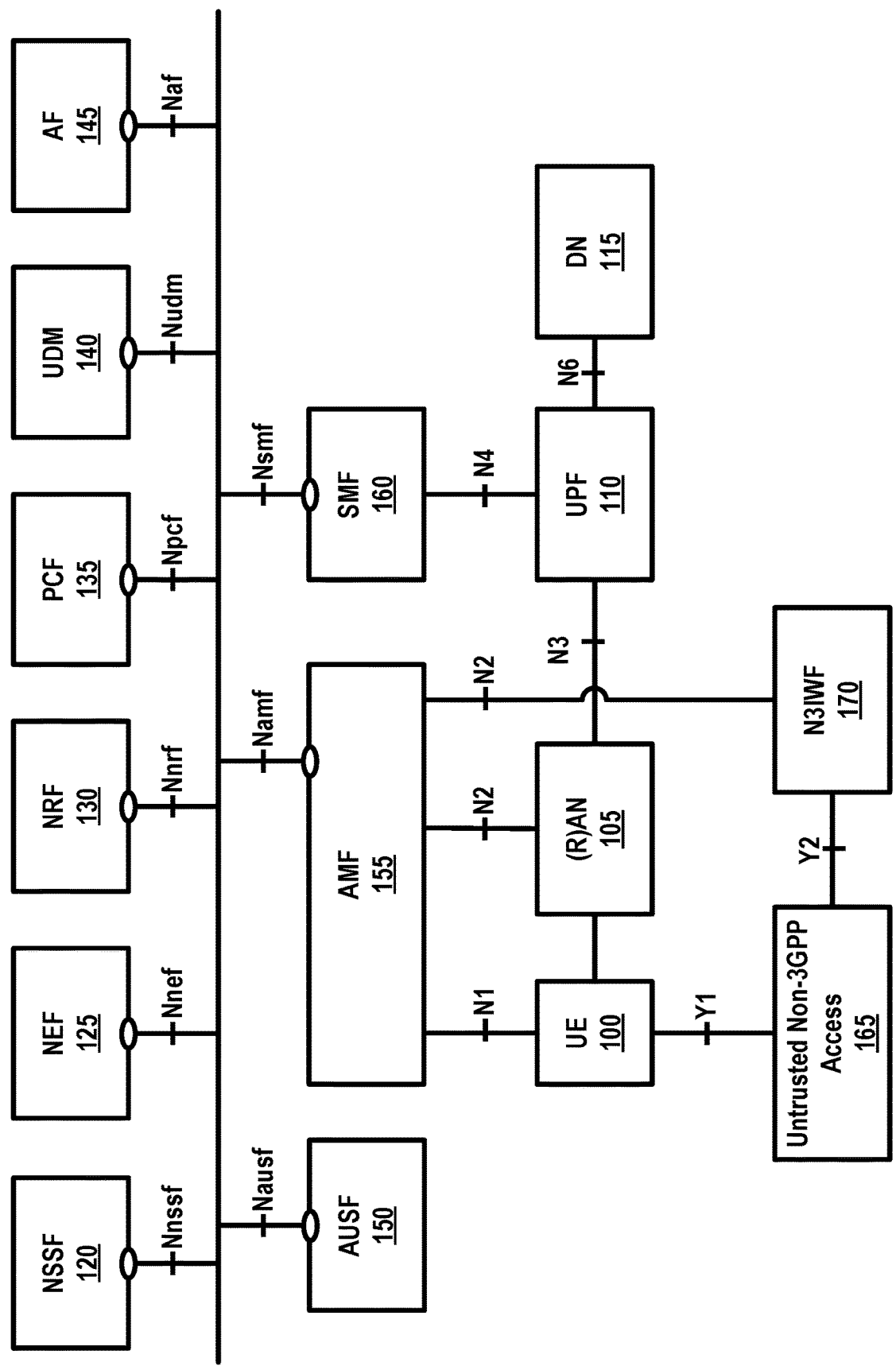
FIG. 1 is a diagram of an example 5G system architecture as per an aspect of an embodiment of the present disclosure.
Figure 2:
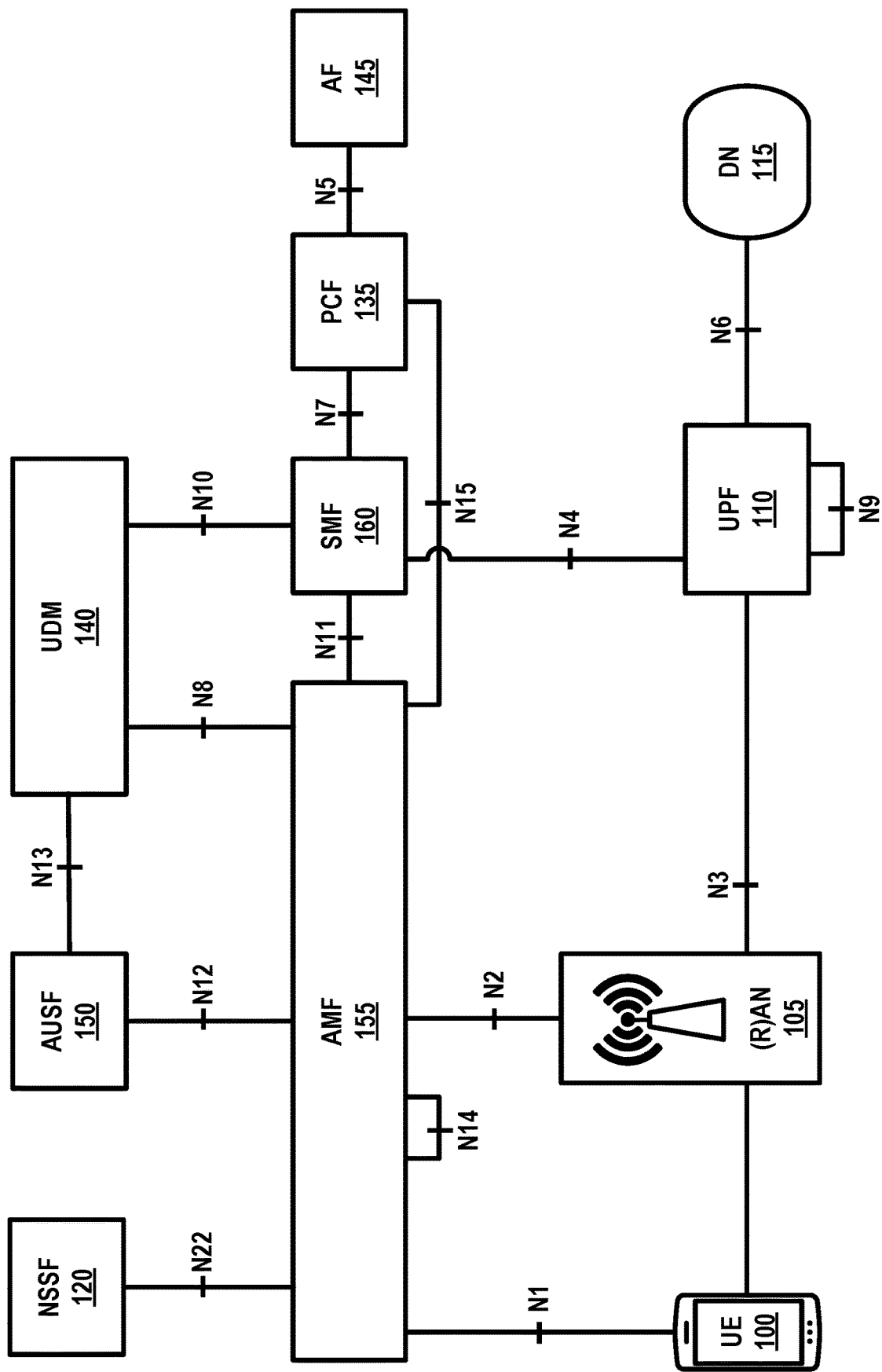
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
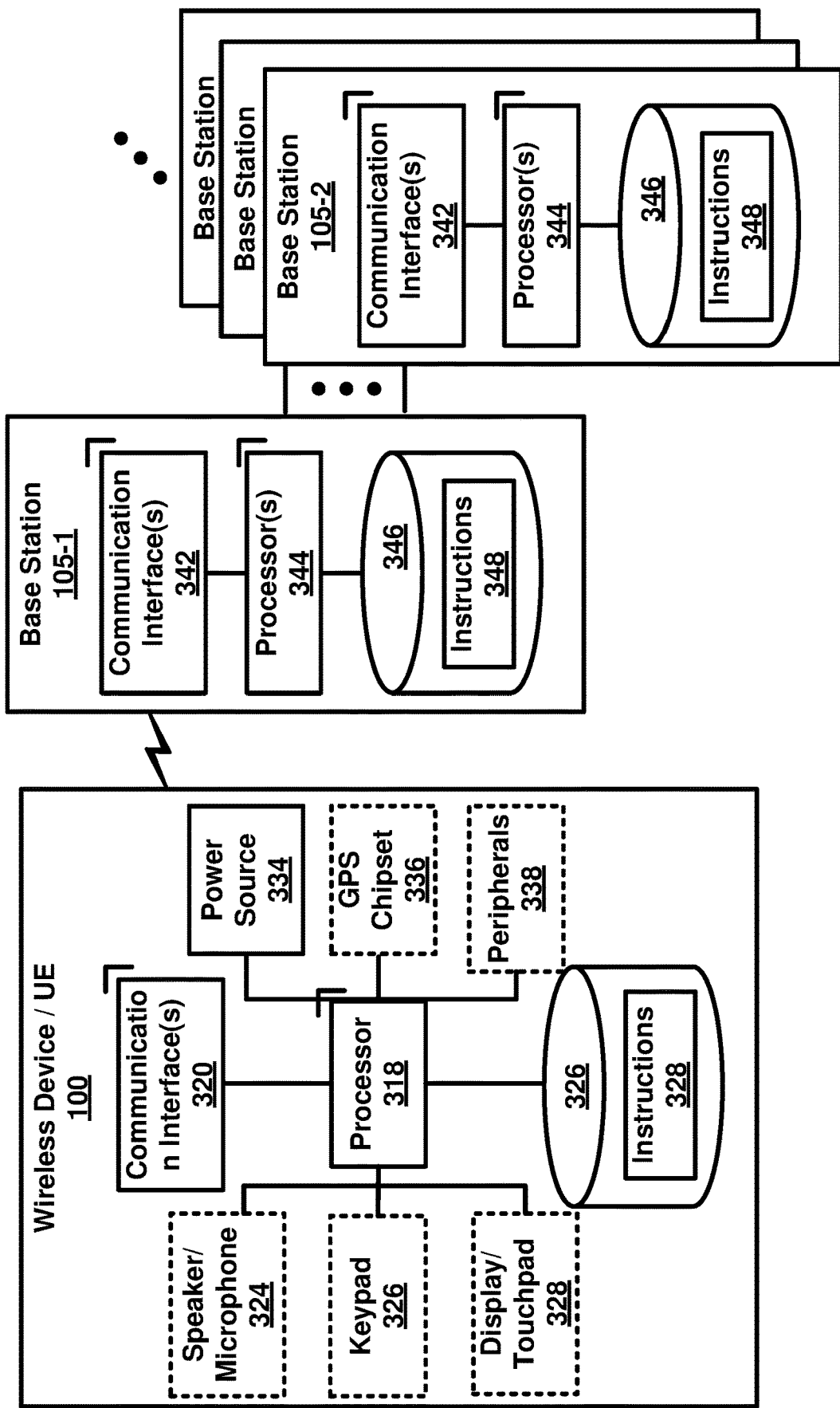
FIG. 3 is a system diagram of an example wireless device and a network node in a 5G system as per an aspect of an embodiment of the present disclosure.
Figure 4:
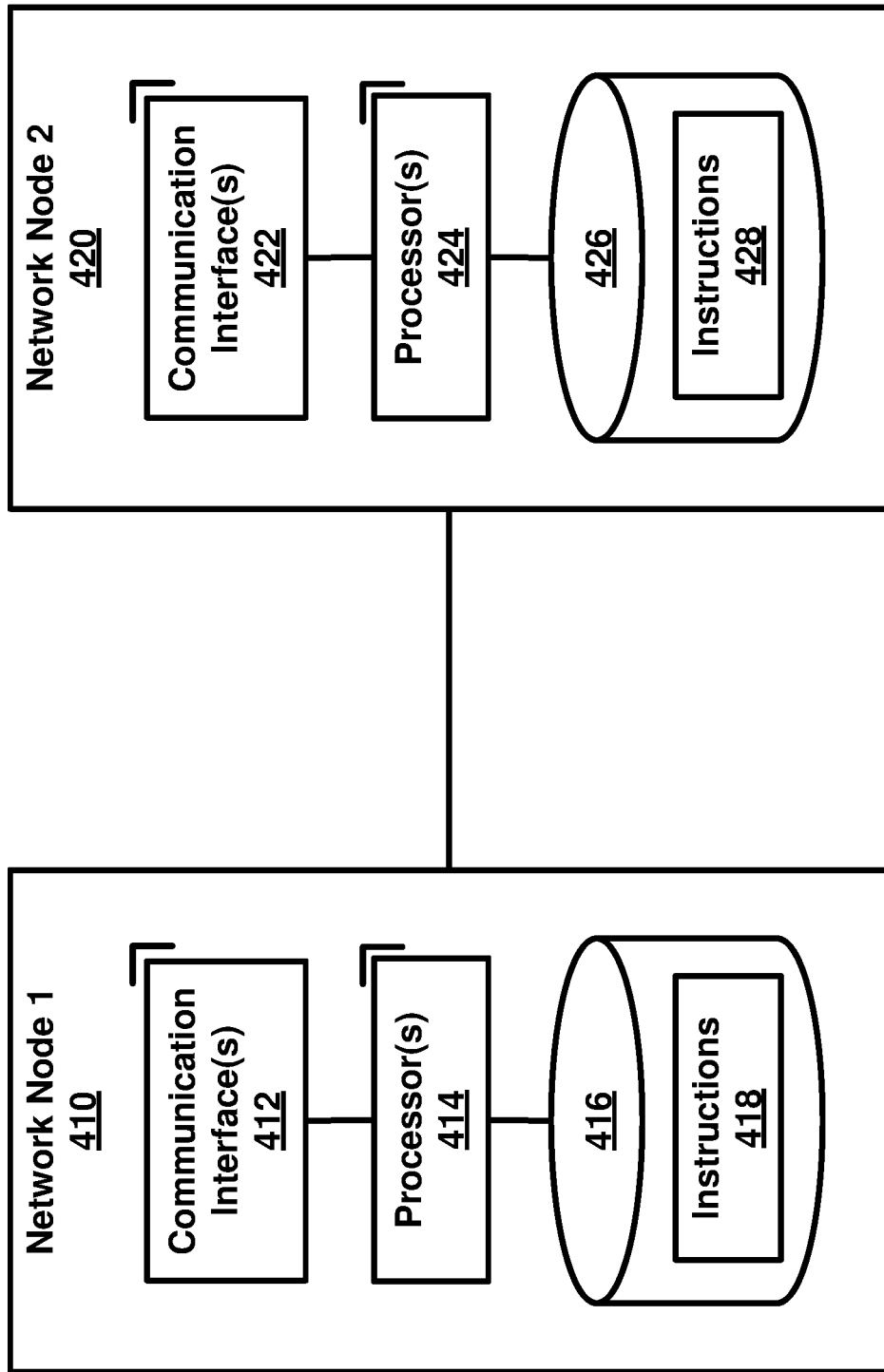
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for UPF session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external UPF session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed UPF session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a UPF session establishment procedure based on its IP stack capabilities and/or configuration. In an example, the SMF 160 may select PDU type of a UPF session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a UPF session establishment procedure, the SMF 160 may send the IP address to the UE 100 via SM NAS signaling. The IPv4 address allocation and/or IPv4 parameter configuration via DHCPv4 may be employed once UPF session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of UPF sessions. A UPF 110 that provides the interface to a data network may support functionality of a UPF session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a UPF session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
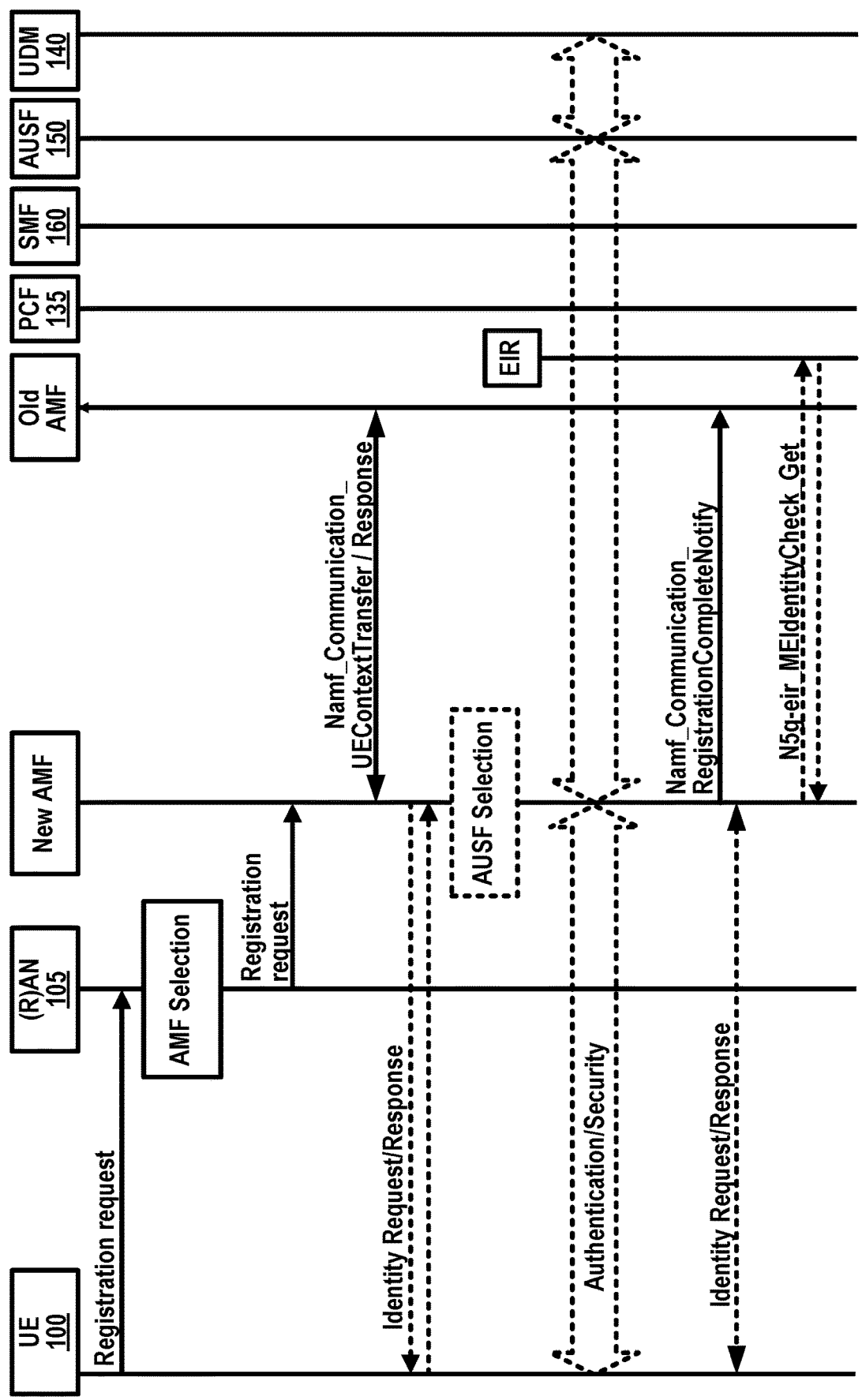
FIG. 8 and FIG. 9 are example call flows for UE registration procedure as per an aspect of an embodiment.
Figure 9:
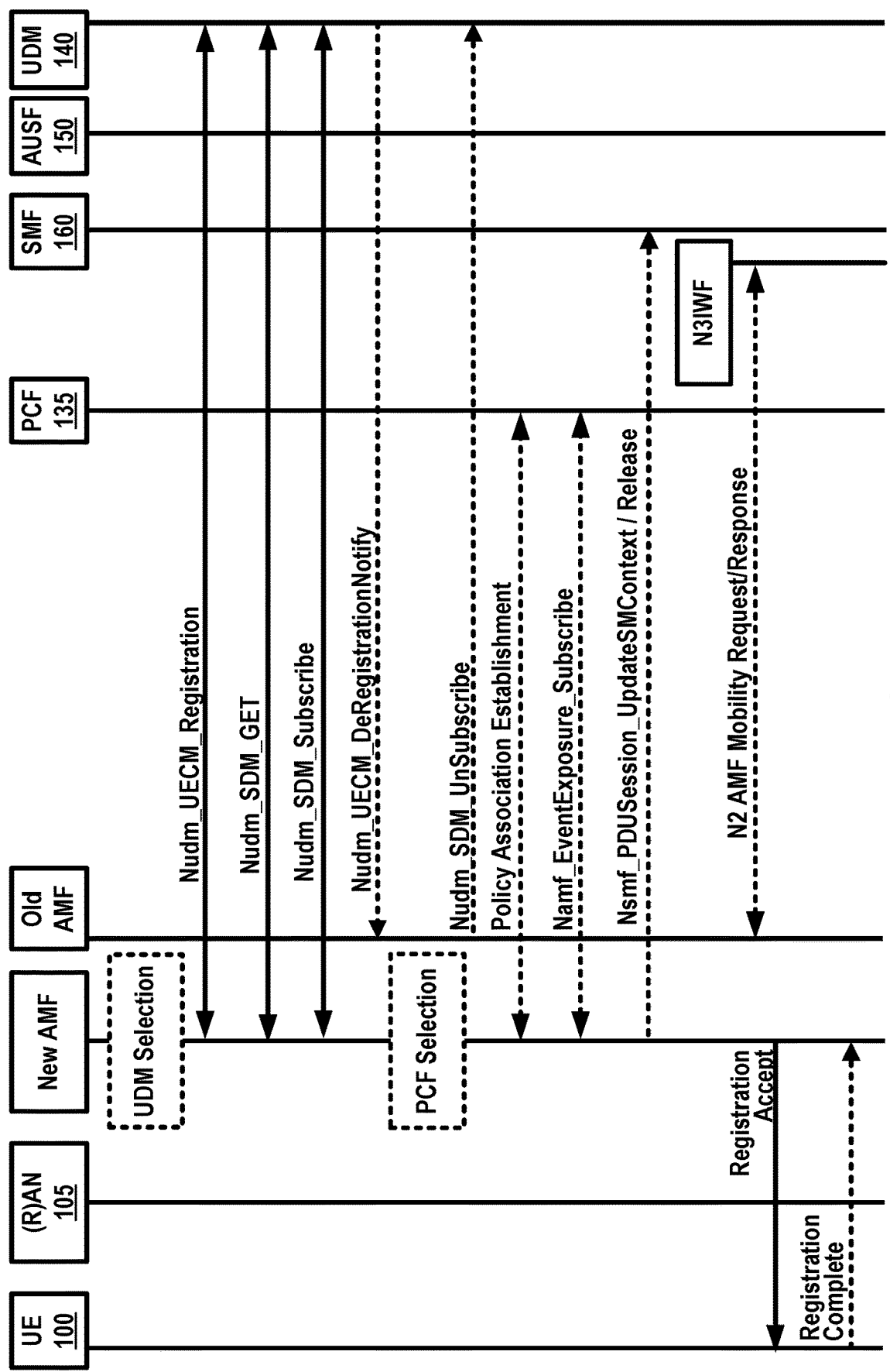

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via UPF sessions that are established upon request from the UE 100.

In an example, a UPF session may support one or more UPF session types. UPF sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a UPF session to a specific DNN.

Figure 7:
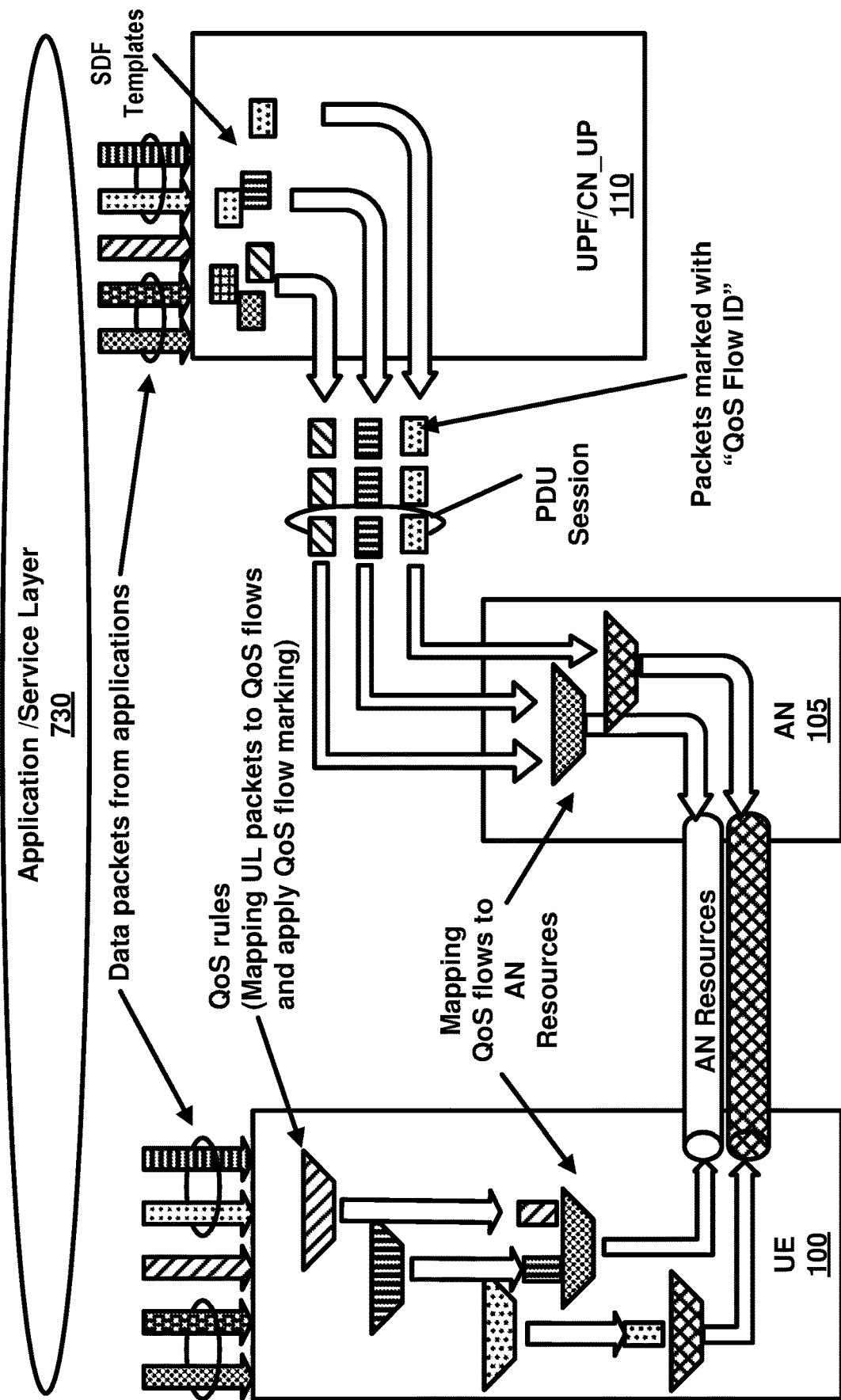
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a UPF session. A QoS flow ID, QFI, may be employed to identify the QoS flow in the 5G system. In an example, user plane traffic with the same QFI within a UPF session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a UPF session.

In an example, the QoS parameters of a QoS flow may be provided to the (R)AN 105 as a QoS profile over N2 at UPF session establishment, QoS flow establishment, or when NG-RAN is used at every time the user plane is activated. In an example, a default QoS rule may be required for every UPF session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A UPF session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more UPF session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service-based interface may represent how a set of services may be provided/exposed by a given NF.

In an example, a service continuity may be an uninterrupted user experience of a service, including the cases where the IP address and/or anchoring point may change. In an example, a session continuity may refer to continuity of a UPF session. For UPF session of IP type session continuity may imply that the IP address is preserved for the lifetime of the UPF session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a UPF session may belong to one specific network slice instance per PLMN. In an example, different network slice instances may not share a UPF session. Different slices may have slice-specific UPF sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more UPF sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more UPF sessions established corresponding to the a specific S-NSSAI, the UE 100 may route the user data of the application in one of the UPF sessions, unless other conditions in the UE 100 may prohibit the use of the UPF sessions. If the application provides a DNN, then the UE 100 may consider the DNN to determine which UPF session to use. In an example, if the UE 100 does not have a UPF session established with the specific S-NSSAI, the UE 100 may request a new UPF session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a UPF session. The selected SMF 160 may establish the UPF session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message (comprising AN parameters, RM-NAS registration request (registration type, SUCI or SUPI or 5G-GUTI, last visited TAI (if available), security parameters, requested NSSAI, mapping of requested NSSAI, UE 100 5GC capability, UPF session status, UPF session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The UPF session status may indicates the previously established UPF sessions in the UE. When the UE 100 is connected to the two AMF 155 belonging to different PLMN via 3GPP access and non-3GPP access then the UPF session status may indicate the established UPF session of the current PLMN in the UE. The UPF session(s) to be re-activated may be included to indicate the UPF session(s) for which the UE 100 may intend to activate UP connections. A UPF session corresponding to a LADN may not be included in the UPF session(s) to be re-activated when the UE 100 is outside the area of availability of the LADN. The follow on request may be included when the UE 100 may have pending uplink signaling and the UE 100 may not include UPF session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection.

In an example, the (R)AN 105 may send to the new AMF 155 an N2 message (comprising: N2 parameters, RM-NAS registration request (registration type, SUPI or 5G-GUTI, last visited TAI (if available), security parameters, requested NSSAI, mapping of requested NSSAI, UE 100 5GC capability, UPF session status, UPF session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request). In an example, if the UE's 5G-GUTI was included in the registration request and the serving AMF 155 has changed since last registration procedure, the new AMF 155 may invoke the Namf_Communication_UEContextTransfer service operation on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established UPF sessions, the old AMF 155 may include SMF 160 information including S-NSSAI(s), SMF 160 identities and UPF session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure may be initiated by the AMF 155 sending an identity request message to the UE 100 requesting the SUCI.

In an example, the UE 100 may respond with an identity response message including the SUCI. The UE 100 may derive the SUCI by using the provisioned public key of the HPLMN.

In an example, the AMF 155 may decide to initiate UE 100 authentication by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which UPF session may not be supported in the new registration area. The new AMF 155 may invoke the Namf_Communication_RegistrationCompleteNotify service operation including the rejected UPF session ID and a reject cause (e.g. the S-NSSAI becomes no longer available) towards the old AMF 155. The new AMF 155 may modify the UPF session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check by invoking the N5g-eir_EquipmentIdentityCheck_Get service operation.

In an example, the new AMF 155, based on the SUPI, may select a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get. The UDM 140 may retrieve this information from UDR by Nudr_UDM_Query(access and mobility subscription data). After a successful response is received, the AMF 155 may subscribe to be notified using Nudm_SDM_Subscribe when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the UPF session(s) on getting this notification. In an example, the old AMF 155 may unsubscribe with the UDM 140 for subscription data using Nudm_SDM_unsubscribe.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select a PCF 135.

In an example, the new AMF 155 may perform a policy association establishment during registration procedure. If the new AMF 155 contacts the PCF 135 identified by the (V-) PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation for UE 100 event subscription.

In an example, the AMF 155 may send to the SMF 160 an Nsmf_PDUSession_UpdateSMContext. In an example, the AMF 155 may invoke the Nsmf_PDUSession_UpdateSMContext if the UPF session(s) to be re-activated is included in the registration request. The AMF 155 may send Nsmf_PDUSession_UpdateSMContext request to SMF 160(s) associated with the UPF session(s) to activate user plane connections of the UPF session(s). The SMF 160 may decide to trigger e.g. the intermediate UPF 110 insertion, removal or change of PSA UPF. In the case that the intermediate UPF 110 insertion, removal, or relocation is performed for the UPF session(s) not included in UPF session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any UPF session status indicates that it is released at the UE 100. The AMF 155 may invoke the Nsmf_PDUSession_ReleaseSMContext service operation towards the SMF 160 in order to release any network resources related to the UPF session.

In an example, the new AMF 155155 may send to a N3IWF an N2 AMF 155 mobility request. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response.

In an example, the new AMF 155 may send to the UE 100 a registration accept (comprising: 5G-GUTI, registration area, mobility restrictions, UPF session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established UPF sessions to the UE 100 in the UPF session status. The UE 100 may remove locally any internal resources related to UPF sessions that are not marked as established in the received UPF session status. In an example, when the UE 100 is connected to the two AMF 155 belonging to different PLMN via 3GPP access and non-3GPP access then the UE 100 may remove locally any internal resources related to the UPF session of the current PLMN that are not marked as established in received UPF session status. If the UPF session status information was in the registration request, the AMF 155 may indicate the UPF session status to the UE. The mapping of allowed NSSAI may be the mapping of each S-NSSAI of the allowed NSSAI to the S-NSSAIs of the configured NSSAI for the HPLMN. The AMF 155 may include in the registration accept message the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request UPF session for emergency services. In an example, the handover restriction list and UE-AMBR may be provided to NG-RAN by the AMF 155.

In an example, the UE 100 may send to the new AMF 155 a registration complete message. In an example, the UE 100 may send the registration complete message to the AMF 155 to acknowledge that a new 5G-GUTI may be assigned. In an example, when information about the UPF session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
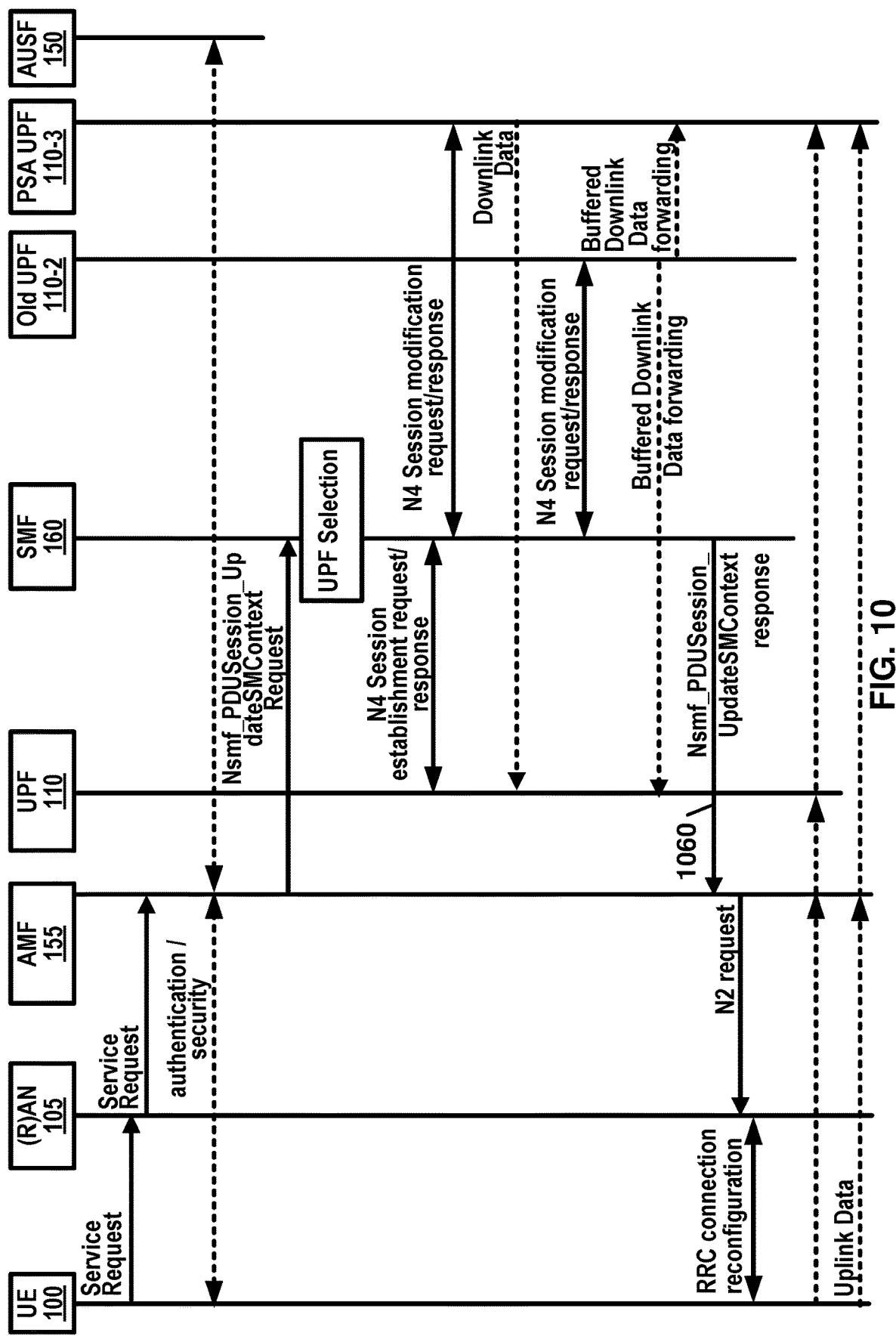
FIG. 10 and FIG. 11 are example call flow for service request procedure as per an aspect of an embodiment of the present disclosure.
Figure 11:
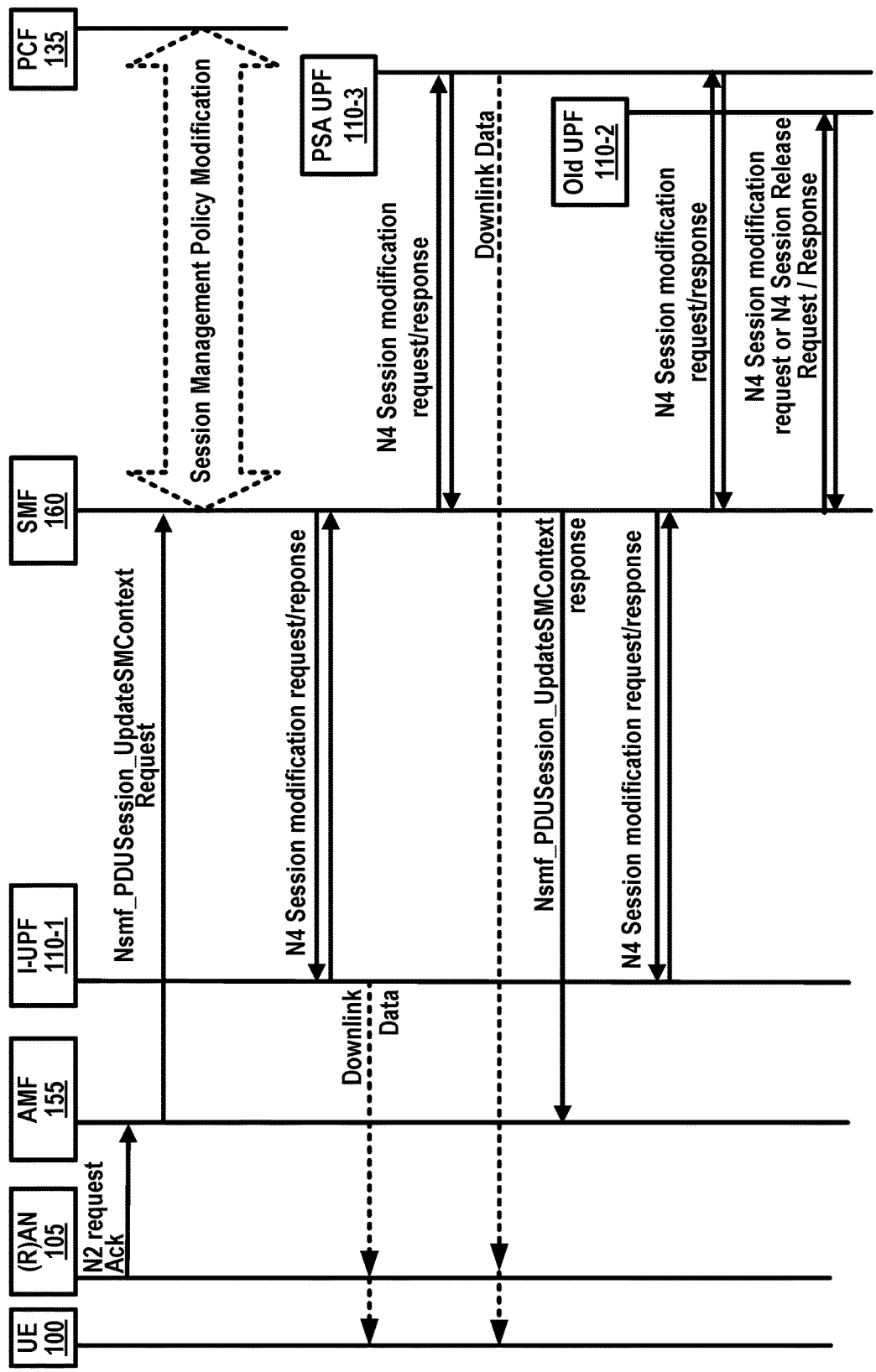

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established UPF session. The service request procedure may be triggered by the UE 100 or the 5GC, and may be used when the UE 100 is in CM-IDLE and/or in CM-CONNECTED and may allow selectively to activate user plane connections for some of the established UPF sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. UPF session establishment from the UE 100 to a SMF 160, via the AMF 155.

In an example, for any service request, the AMF 155 may respond with a service accept message to synchronize UPF session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and UPF session Anchor PSA UPF 110-3 may be involved.

In an example, the UE 100 may send to a (R)AN 105 an AN message comprising AN parameters, mobility management, MM NAS service request (e.g., list of UPF sessions to be activated, list of allowed UPF sessions, security parameters, UPF session status, and/or the like), and/or the like. In an example, the UE 100 may provide the list of UPF sessions to be activated when the UE 100 may re-activate the UPF session(s). The list of allowed UPF sessions may be provided by the UE 100 when the service request may be a response of a paging or a NAS notification, and may identify the UPF sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of UPF sessions to be activated, the UPF session(s) for which the UP connections are to be activated in the NAS service request message. If the service request may be triggered for signaling, the UE 100 may not identify any UPF session(s). If this procedure may be triggered for paging response, and/or the UE 100 may have at the same time user data to be transferred, the UE 100 may identify the UPF session(s) whose UP connections may be activated in MM NAS service request message, by the list of UPF sessions to be activated.

In an example, if the service request over 3GPP access may be triggered in response to a paging indicating non-3GPP access, the NAS service request message may identify in the list of allowed UPF sessions the list of UPF sessions associated with the non-3GPP access that may be re-activated over 3GPP. In an example, the UPF session status may indicate the UPF sessions available in the UE 100. In an example, the UE 100 may not trigger the service request procedure for a UPF session corresponding to a LADN when the UE 100 may be outside the area of availability of the LADN. The UE 100 may not identify such UPF session(s) in the list of UPF sessions to be activated, if the service request may be triggered for other reasons.

In an example, the (R)AN 105 may send to AMF 155 an N2 Message (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the UPF session status, the AMF 155 may initiate UPF session release procedure in the network for the UPF sessions whose UPF session ID(s) may be indicated by the UE 100 as not available.

In an example, if the service request was not sent integrity protected or integrity protection verification failed, the AMF 155 may initiate a NAS authentication/security procedure.

In an example, if the UE 100 triggers the service request to establish a signaling connection, upon successful establishment of the signaling connection, the UE 100 and the network may exchange NAS signaling.

In an example the AMF 155 may send to the SMF 160 a UPF session update context request e.g., Nsmf_PDUSession_UpdateSMContext request comprising UPF session ID(s), Cause(s), UE 100 location information, access type, and/or the like.

In an example, the Nsmf_PDUSession_UpdateSMContext request may be invoked by the AMF 155 if the UE 100 may identify UPF session(s) to be activated in the NAS service request message. In an example, the Nsmf_PDUSession_UpdateSMContext request may be triggered by the SMF 160 wherein the UPF session(s) identified by the UE 100 may correlate to other UPF session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the UPF session(s) to be activated and may send an Nsmf_PDUSession_UpdateSMContext request to SMF 160(*s*) associated with the UPF session(s) with cause set to indicate establishment of user plane resources for the UPF session(s).

In an example, if the procedure may be triggered in response to paging indicating non-3GPP access, and the list of allowed UPF sessions provided by the UE 100 may not include the UPF session for which the UE 100 was paged, the AMF 155 may notify the SMF 160 that the user plane for the UPF session may not be re-activated. The service request procedure may succeed without re-activating the user plane of any UPF sessions, and the AMF 155 may notify the UE 100.

In an example, if the UPF session ID may correspond to a LADN and the SMF 160 may determine that the UE 100 may be outside the area of availability of the LADN based on the UE 100 location reporting from the AMF 155, the SMF 160 may decide to (based on local policies) keep the UPF session, may reject the activation of user plane connection for the UPF session and may inform the AMF 155. In an example, if the procedure may be triggered by a network triggered service request, the SMF 160 may notify the UPF 110 that originated the data notification to discard downlink data for the UPF sessions and/or to not provide further data notification messages. The SMF 160 may respond to the AMF 155 with an appropriate reject cause and the user plane activation of UPF session may be stopped.

In an example, if the UPF session ID may correspond to a LADN and the SMF 160 may determine that the UE 100 may be outside the area of availability of the LADN based on the UE 100 location reporting from the AMF 155, the SMF 160 may decide to (based on local policies) release the UPF session. The SMF 160 may locally release the UPF session and may inform the AMF 155 that the UPF session may be released. The SMF 160 may respond to the AMF 155 with an appropriate reject cause and the user plane Activation of UPF session may be stopped.

In an example, if the UP activation of the UPF session may be accepted by the SMF 160, based on the location info received from the AMF 155, the SMF 160 may check the UPF 110 Selection Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, UPF session type (i.e. IPv4, IPv6, ethernet type or unstructured type) and if applicable, the static IP address/prefix, SSC mode selected for the UPF session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as UPF session anchor; may trigger re-establishment of the UPF session to perform relocation/reallocation of the UPF 110 acting as UPF session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request. In an example, if the SMF 160 may select a new UPF 110 to act as intermediate UPF 110-2 for the UPF session, or if the SMF 160 may select to insert an intermediate UPF 110 for a UPF session which may not have an intermediate UPF 110-2, an N4 session establishment request message may be sent to the new UPF 110, providing packet detection, data forwarding, enforcement and reporting rules to be installed on the new intermediate UPF. The UPF session anchor addressing information (on N9) for this UPF session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message. In case the UPF 110 may allocate CN tunnel info, the UPF 110 may provide DL CN tunnel info for the UPF 110 acting as UPF session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the UPF session or may remove the old I-UPF 110-2, the SMF 160 may send N4 session modification request message to UPF session anchor, PSA UPF 110-3, providing the data forwarding indication and DL tunnel information from new intermediate UPF 110.

In an example, if the new intermediate UPF 110 may be added for the UPF session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the UPF session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message e.g., a Nsmf_PDUSession_UpdateSMContext response (comprising: N1 SM container (UPF session ID, UPF session re-establishment indication), N2 SM information (UPF session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a UPF session that the SMF 160 may determine to be served by the current UPF 110, e.g., UPF session anchor or intermediate UPF, the SMF 160 may generate N2 SM information and may send an Nsmf_PDUSession_UpdateSMContext response to the AMF 155 to establish the user plane(s). The N2 SM information may contain information that the AMF 155 may provide to the RAN 105. In an example, for a UPF session that the SMF 160 may determine as requiring a UPF 110 relocation for UPF session anchor UPF, the SMF 160 may reject the activation of UP of the UPF session by sending Nsmf_PDUSession_UpdateSMContext response that may contain N1 SM container to the UE 100 via the AMF 155. The N1 SM container may include the corresponding UPF session ID and UPF session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the UPF sessions. In an example, the SMF 160 may resume sending DL data notifications to the AMF 155 in case of DL data.

In an example, the SMF 160 may send a message to the AMF 155 to reject the activation of UP of the UPF session by including a cause in the Nsmf_PDUSession_UpdateSMContext response if the UPF session may correspond to a LADN and the UE 100 may be outside the area of availability of the LADN, or if the AMF 155 may notify the SMF 160 that the UE 100 may be reachable for regulatory prioritized service, and the UPF session to be activated may not for a regulatory prioritized service; or if the SMF 160 may decide to perform PSA UPF 110-3 relocation for the requested UPF session.

In an example, the AMF 155 may send to the (R)AN 105 an N2 request message (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the UPF sessions that may be activated and N3 tunnel IDs in the UE 100 RAN 105 context. In an example, the MM NAS service accept may include UPF session status in the AMF 155. If the activation of UP of a UPF session may be rejected by the SMF 160, the MM NAS service accept may include the UPF session ID and the reason why the user plane resources may not be activated (e.g. LADN not available). Local UPF session release during the session request procedure may be indicated to the UE 100 via the session Status.

In an example, if there are multiple UPF sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for UPF session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and UPF session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a UPF session establishment procedure that the UE 100 may be using a UPF session related to latency sensitive services, for any of the UPF sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration with the UE 100 depending on the QoS information for all the QoS flows of the UPF sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of UPF sessions that may not be available in 5GC.

In an example, if the N1 SM information may be transmitted to the UE 100 and may indicate that some UPF session(s) may be re-established, the UE 100 may initiate UPF session re-establishment for the UPF session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack (e.g., N2 SM information (comprising: AN tunnel info, list of accepted QoS flows for the UPF sessions whose UP connections are activated, list of rejected QoS flows for the UPF sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request (N2 SM information (AN tunnel info), RAT type) per UPF session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message (e.g., a Npcf_SMPolicyControl_UpdateNotify operation).

In an example, if the SMF 160 may select a new UPF 110 to act as intermediate UPF 110 for the UPF session, the SMF 160 may initiates an N4 session modification procedure to the new I-UPF 110 and may provide AN tunnel info. The downlink data from the new I-UPF 110 may be forwarded to RAN 105 and UE 100. In an example, the UPF 110 may send to the SMF 160, an N4 session modification response. In an example, the SMF 160 may send to the AMF 155, an Nsmf_PDUSession_UpdateSMContext response.

In an example, if forwarding tunnel may be established to the new I-UPF 110 and if the timer SMF 160 set for forwarding tunnel may be expired, the SMF 160 may sends N4 session modification request to new (intermediate) UPF 110 acting as N3 terminating point to release the forwarding tunnel. In an example, the new (intermediate) UPF 110 may send to the SMF 160 an N4 session modification response. In an example, the SMF 160 may send to the PSA UPF 110-3 an N4 session modification request, or N4 session release request. In an example, if the SMF 160 may continue using the old UPF 110-2, the SMF 160 may send an N4 session modification request, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
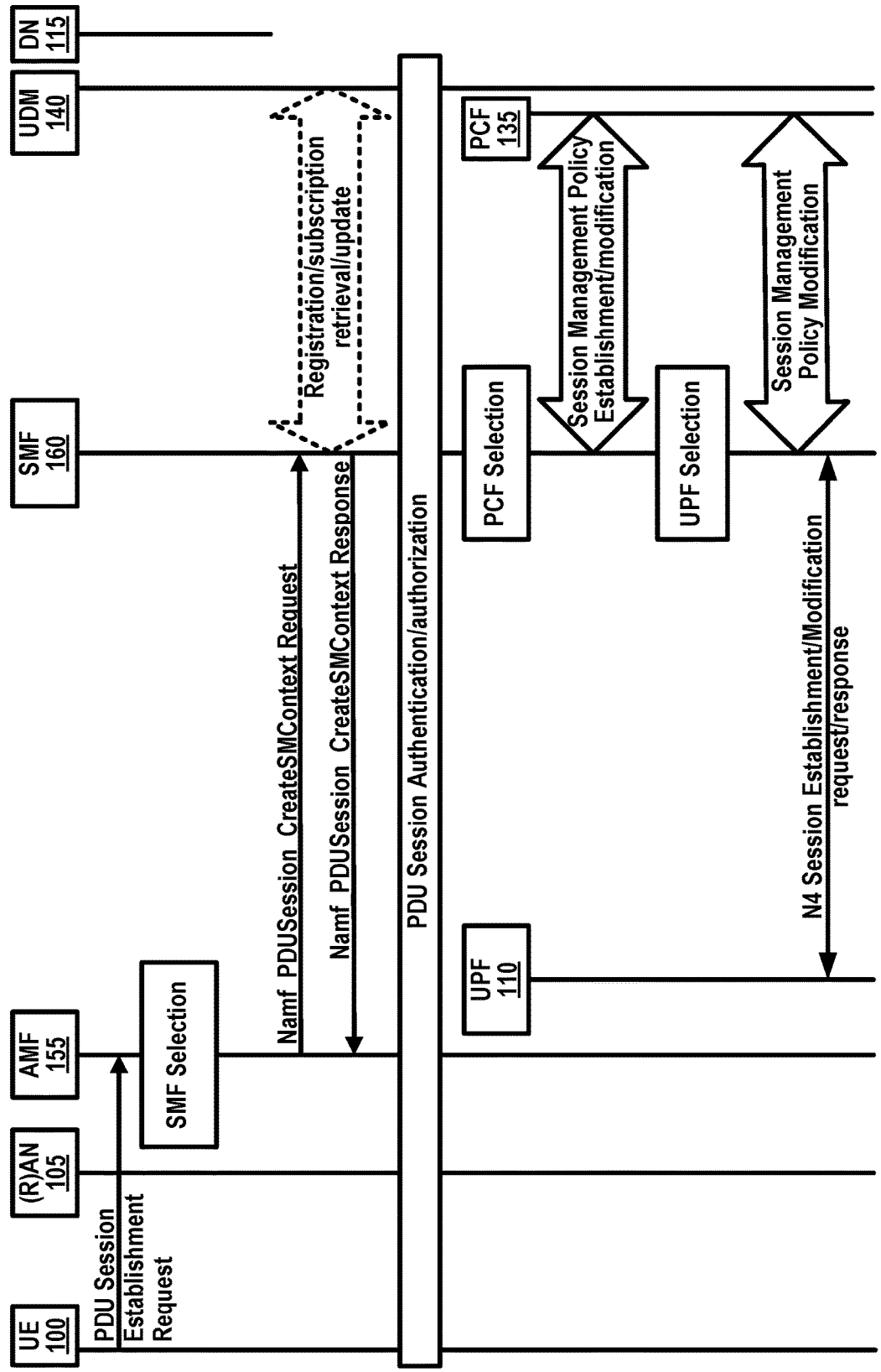
FIGS. 12 and 13 are example call flow for UPF session establishment procedure as per an aspect of an embodiment of the present disclosure.
Figure 13:
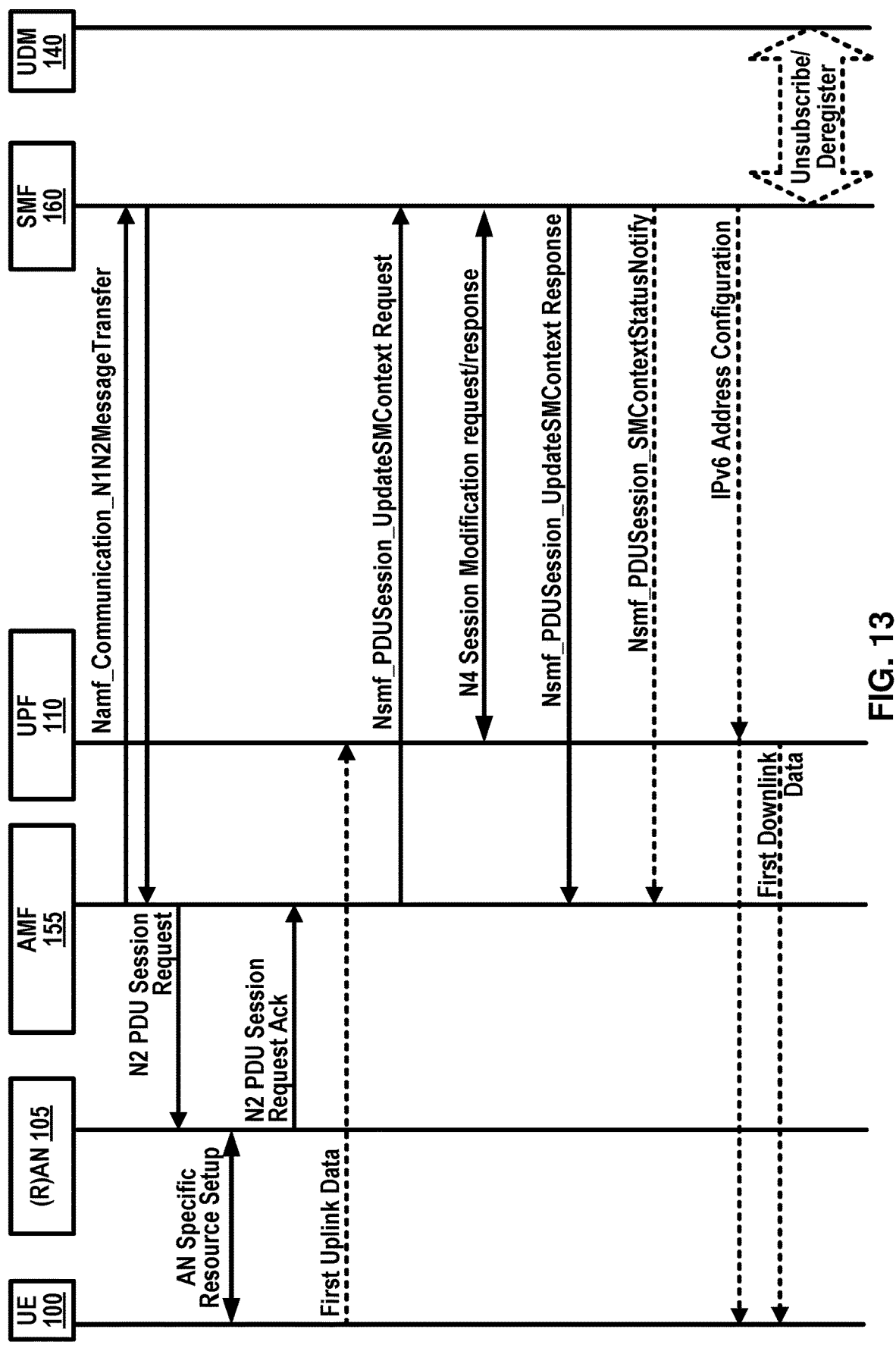

An example UPF session establishment procedure depicted in FIG. 12 and FIG. 13. In an example embodiment, when the UPF session establishment procedure may be employed, the UE 100 may send to the AMF 155 a NAS Message (or a SM NAS message) comprising NSSAI, S-NSSAI (e.g., requested S-NSSAI, allowed S-NSSAI, subscribed S-NSSAI, and/or the like), DNN, UPF session ID, request type, old UPF session ID, N1 SM container (UPF session establishment request), and/or the like. In an example, the UE 100, in order to establish a new UPF session, may generate a new UPF session ID. In an example, when emergency service may be required and an emergency UPF session may not already be established, the UE 100 may initiate the UE 100 requested UPF session establishment procedure with a request type indicating emergency request. In an example, the UE 100 may initiate the UE 100 requested UPF session establishment procedure by the transmission of the NAS message containing a UPF session establishment request within the N1 SM container. The UPF session establishment request may include a PDU type, SSC mode, protocol configuration options, and/or the like. In an example, the request type may indicate initial request if the UPF session establishment is a request to establish the new UPF session and may indicate existing UPF session if the request refers to an existing UPF session between 3GPP access and non-3GPP access or to an existing PDN connection in EPC. In an example, the request type may indicate emergency request if the UPF session establishment may be a request to establish a UPF session for emergency services. The request type may indicate existing emergency UPF session if the request refers to an existing UPF session for emergency services between 3GPP access and non-3GPP access. In an example, the NAS message sent by the UE 100 may be encapsulated by the AN in a N2 message towards the AMF 155 that may include user location information and access technology type information. In an example, the UPF session establishment request message may contain SM PDU DN request container containing information for the UPF session authorization by the external DN. In an example, if the procedure may be triggered for SSC mode 3 operation, the UE 100 may include the old UPF session ID which may indicate the UPF session ID of the on-going UPF session to be released, in the NAS message. The old UPF session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a UPF session establishment for a UPF session corresponding to a LADN when the UE 100 is outside the area of availability of the LADN.

In an example, the AMF 155 may determine that the NAS message or the SM NAS message may correspond to the request for the new UPF session based on that request type indicates initial request and that the UPF session ID may not be used for any existing UPF session(s) of the UE 100. If the NAS message does not contain an S-NSSAI, the AMF 155 may determine a default S-NSSAI for the requested UPF session either according to the UE 100 subscription, if it may contain only one default S-NSSAI, or based on operator policy. In an example, the AMF 155 may perform SMF 160 selection and select an SMF 160. If the request type may indicate initial request or the request may be due to handover from EPS, the AMF 155 may store an association of the S-NSSAI, the UPF session ID and a SMF 160 ID. In an example, if the request type is initial request and if the old UPF session ID indicating the existing UPF session may be contained in the message, the AMF 155 may select the SMF 160 and may store an association of the new UPF session ID and the selected SMF 160 ID.

In an example, the AMF 155 may send to the SMF 160, an N11 message, e.g., Nsmf_PDUSession_CreateSMContext request (comprising: SUPI or PEI, DNN, S-NSSAI, UPF session ID, AMF 155 ID, request type, N1 SM container (UPF session establishment request), user location information, access type, PEI, GPSI), or Nsmf_PDUSession_UpdateSMContext request (SUPI, DNN, S-NSSAI, UPF session ID, AMF 155 ID, request type, N1 SM container (UPF session establishment request), user location information, access type, RAT type, PEI). In an example, if the AMF 155 may not have an association with the SMF 160 for the UPF session ID provided by the UE 100 (e.g when request type indicates initial request), the AMF 155 may invoke the Nsmf_PDUSession_CreateSMContext request, but if the AMF 155 already has an association with an SMF 160 for the UPF session ID provided by the UE 100 (e.g when request type indicates existing UPF session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the UPF session ID together with the N1 SM container containing the UPF session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency UPF session and, if the SMF 160 has not yet registered and subscription data may not be available, the SMF 160 may register with the UDM 140, and may retrieve subscription data and subscribes to be notified when subscription data may be modified. In an example, if the request type may indicate existing UPF session or existing emergency UPF session, the SMF 160 may determine that the request may be due to handover between 3GPP access and non-3GPP access or due to handover from EPS. The SMF 160 may identify the existing UPF session based on the UPF session ID. The SMF 160 may not create a new SM context but instead may update the existing SM context and may provide the representation of the updated SM context to the AMF 155 in the response. if the request type may be initial request and if the old UPF session ID may be included in Nsmf_PDUSession_CreateSMContext request, the SMF 160 may identify the existing UPF session to be released based on the old UPF session ID.

In an example, the SMF 160 may send to the AMF 155, the N11 message response, e.g., either a UPF session create/update response, Nsmf_PDUSession_CreateSMContext response (cause, SM context ID or N1 SM container (UPF session reject(cause))) or an Nsmf_PDUSession_UpdateSMContext response.

In an example, if the SMF 160 may perform secondary authorization/authentication during the establishment of the UPF session by a DN-AAA server, the SMF 160 may select a UPF 110 and may trigger a UPF session establishment authentication/authorization.

In an example, if the request type may indicate initial request, the SMF 160 may select an SSC mode for the UPF session. The SMF 160 may select one or more UPFs as needed. In case of PDU type IPv4 or IPv6, the SMF 160 may allocate an IP address/prefix for the UPF session. In case of PDU type IPv6, the SMF 160 may allocate an interface identifier to the UE 100 for the UE 100 to build its link-local address. For Unstructured PDU type the SMF 160 may allocate an IPv6 prefix for the UPF session and N6 point-to-point tunneling (based on UDP/IPv6).

In an example, if dynamic PCC is deployed, the may SMF 160 performs PCF 135 selection. If the request type indicates existing UPF session or existing emergency UPF session, the SMF 160 may use the PCF 135 already selected for the UPF session. If dynamic PCC is not deployed, the SMF 160 may apply local policy.

In an example, the SMF 160 may perform a session management policy establishment procedure to establish a UPF session with the PCF 135 and may get the default PCC Rules for the UPF session. The GPSI may be included if available at the SMF 160. If the request type in N11 message indicates existing UPF session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in N11 message indicates initial request, the SMF 160 may select an SSC mode for the UPF session. The SMF 160 may select one or more UPFs as needed. In case of PDU type IPv4 or IPv6, the SMF 160 may allocate an IP address/prefix for the UPF session. In case of PDU type IPv6, the SMF 160 may allocate an interface identifier to the UE 100 for the UE 100 to build its link-local address. For unstructured PDU type the SMF 160 may allocate an IPv6 prefix for the UPF session and N6 point-to-point tunneling (e.g., based on UDP/IPv6). In an example, for Ethernet PDU type UPF session, neither a MAC nor an IP address may be allocated by the SMF 160 to the UE 100 for this UPF session.

In an example, if the request type in N11 message is existing UPF session, the SMF 160 may maintain the same IP address/prefix that may be allocated to the UE 100 in the source network.

In an example, if the request type in N11 message indicates existing UPF session referring to an existing UPF session moved between 3GPP access and non-3GPP access, the SMF 160 may maintain the SSC mode of the UPF session, e.g., the current UPF session Anchor and IP address. In an example, the SMF 160 may trigger e.g. new intermediate UPF 110 insertion or allocation of a new UPF 110. In an example, if the request type indicates emergency request, the SMF 160 may select the UPF 110 and may select SSC mode 1.

In an example, the SMF 160 may perform a session management policy modification procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure with the selected UPF 110. The SMF 160 may initiate an N4 session modification procedure with the selected UPF 110. In an example, the SMF 160 may send an N4 session establishment/modification request to the UPF 110 and may provide packet detection, enforcement, reporting rules, and/ or the like to be installed on the UPF 110 for this UPF session. If CN tunnel info is allocated by the SMF 160, the CN tunnel info may be provided to the UPF 110. If the selective user plane deactivation is required for this UPF session, the SMF 160 may determine the Inactivity Timer and may provide it to the UPF 110. In an example, the UPF 110 may acknowledges by sending an N4 session establishment/modification response. If CN tunnel info is allocated by the UPF, the CN tunnel info may be provided to SMF 160. In an example, if multiple UPFs are selected for the UPF session, the SMF 160 may initiate N4 session establishment/modification procedure with each UPF 110 of the UPF session.

In an example, the SMF 160 may send to the AMF 155 an Namf_Communication_N1N2MessageTransfer message (comprising UPF session ID, access type, N2 SM information (UPF session ID, QFI(s), QoS profile(s), CN tunnel info, S-NSSAI, session-AMBR, UPF session type, and/or the like), N1 SM container (UPF session establishment accept (QoS Rule(s), selected SSC mode, S-NSSAI, allocated IPv4 address, interface identifier, session-AMBR, selected UPF session type, and/or the like))). In case of multiple UPFs are used for the UPF session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the UPF session, one or multiple QoS profiles and the corresponding QFIs may be provided to the (R)AN 105, the UPF session ID may be used by AN signaling with the UE 100 to indicate to the UE 100 the association between AN resources and a UPF session for the UE 100, and/or the like). In an example, a UPF session may be associated to an S-NSSAI and a DNN. In an example, the N1 SM container may contain the UPF session establishment accept that the AMF 155 may provide to the UE 100. In an example, multiple QoS rules and QoS profiles may be included in the UPF session establishment accept within the N1 SM and in the N2 SM information. In an example, the Namf_Communication_N1N2MessageTransfer may further comprise the UPF session ID and information allowing the AMF 155 to know which access towards the UE 100 to use.

In an example, the AMF 155 may send to the (R)AN 105 an N2 UPF session request (comprising N2 SM information, NAS message (UPF session ID, N1 SM container (UPF session establishment accept, and/or the like))). In an example, the AMF 155 may send the NAS message that may comprise UPF session ID and UPF session establishment accept targeted to the UE 100 and the N2 SM information received from the SMF 160 within the N2 UPF session request to the (R)AN 105.

In an example, the (R)AN 105 may issue AN specific signaling exchange with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the UPF session request. In an example, (R)AN 105 may allocate (R)AN 105 N3 tunnel information for the UPF session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message (UPF session ID, N1 SM container (UPF session establishment accept)) to the UE 100. The (R)AN 105 may provide the NAS message to the UE 100 if the necessary RAN 105 resources are established and the allocation of (R)AN 105 tunnel information are successful.

In an example, the N2 UPF session response may comprise a UPF session ID, cause, N2 SM information (UPF session ID, AN tunnel info, list of accepted/rejected QFI(s)), and/or the like. In an example, the AN tunnel info may correspond to the access network address of the N3 tunnel corresponding to the UPF session.

In an example, the AMF 155 may forward the N2 SM information received from (R)AN 105 to the SMF 160 via a Nsmf_PDUSession_UpdateSMContext request (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure with the UPF 110. The SMF 160 may provide AN tunnel info to the UPF 110 as well as the corresponding forwarding rules. In an example, the UPF 110 may provide an N4 session modification response to the SMF 160160.

In an example, the SMF 160 may send to the AMF 155 an Nsmf_PDUSession_UpdateSMContext response (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release). In an example, if during the procedure, any time the UPF session establishment is not successful, the SMF 160 may inform the AMF 155 by invoking Nsmf_PDUSession_SMContextStatusNotify(release). The SMF 160 may releases any N4 session(s) created, any UPF session address if allocated (e.g IP address) and may release the association with the PCF 135.

In an example, in case of PDU type IPv6, the SMF 160 may generate an IPv6 Router Advertisement and may send it to the UE 100 via N4 and the UPF 110.

In an example, if the UPF session may not be established, the SMF 160 may unsubscribe to the modifications of session management subscription data for the corresponding (SUPI, DNN, S-NSSAI), using Nudm_SDM_Unsubscribe (SUPI, DNN, S-NSSAI), if the SMF 160 is no more handling a UPF session of the UE 100 for this (DNN, S-NSSAI). In an example, if the UPF session may not be established, the SMF 160 may deregister for the given UPF session using Nudm_UECM_Deregistration (SUPI, DNN, UPF session ID).

In a 5G Core network, a network may get congested. For example, traffic load on at least one UPF may exceed a load threshold (e.g. 70%, 80%). In an example, a network may need traffic management for network configuration polices and/or system operation maintenance. During congestion or in a situation requiring traffic management, a UPF may not be able to guarantee expected quality of services and packet dropping rate may increase. Service quality may be degraded during congestion when existing 5G core signaling is implemented. There is a need to implement enhanced 5G core signaling mechanisms to reduce congestion in at least one UPF.

Implementation of existing mechanism to transfer a batch of 5G sessions (e.g. UPF sessions of multiple UEs) from at least one UPF to at least on UPF requires a large signaling overhead. There is a need to improve existing 5G core signaling mechanism to reduce signaling overhead to transfer a batch of sessions.

Example embodiments introduces enhanced 5G core signaling mechanisms to resolve UPF congestion and/or to perform traffic management. Example embodiments improve quality of service for a plurality of sessions when UPF is congested. The example embodiments may be used for maintenance, for relieving existing traffic condition in the network, for load balancing, and/or traffic management.

Example embodiments enhance 5G core signaling mechanisms to implement network initiated batch session transfer and reduce singling overhead. In example embodiments, reallocation and/or redeployment of network functions may be implemented based on traffic conditions, load status, congestion status, maintenance and/or the like. Implementation of example embodiments may include scenarios such as re-balancing of overall traffic load or service specific traffic load and/or transferring of user plane function (UPF) sessions or a subset of UPF sessions belonging to a UPF to at least one new UPF. A subset of UPF sessions may be selected based on operator policies, e.g., sessions related to a particular service, sessions of a particular quality of service (QoS) or protocol, or sessions destined for particular DNN(s).

Example embodiments provide transferring mechanism of a session management function (SMF) for one or more UPF sessions associated with one or more wireless devices in batch from one UPF to the one or more UPFs. Transferring UPF sessions may be determined by the SMF based on internal processing, an indication received from one or more network functions (e.g. within or outside of the network slice, and/or within or outside of the network), and/or the like.

Example embodiments may be implemented in other type of wireless networks, for example, further enhancement of 5G wireless communication system.

Figure 14:
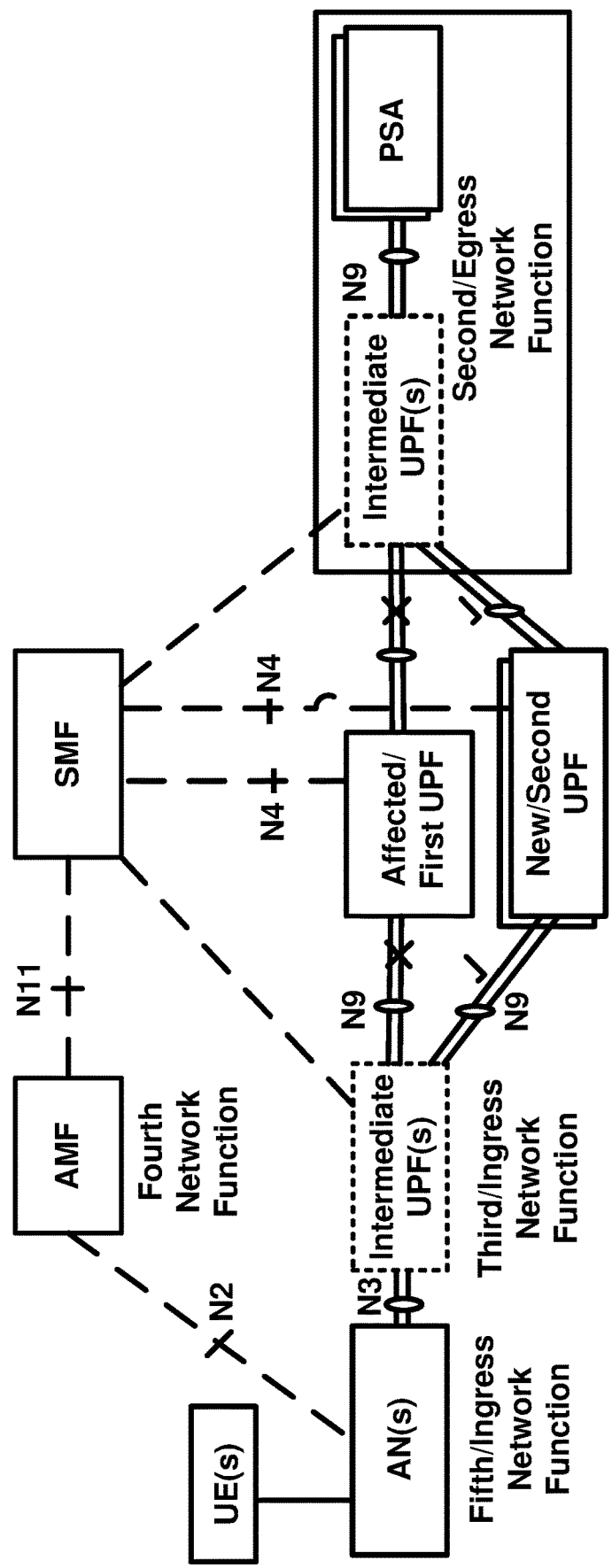
FIG. 14 is an example depicting network scenario where one or more intermediate UPFs present between access network and a first UPF and between the first UPF and PDU session anchor UPF as per an aspect of an embodiment of the present disclosure.

An example FIG. 14 may illustrate an example of a network scenario where a first UPF is shown as an intermediate UPF that resides between an access network and a PDU session anchor (PSA) UPF. In an example, one or more intermediate UPFs may exist between the access network and the first UPF. In an example, one or more intermediate UPFs may exist between the first UPF and the UPF session anchor UPF. The first UPF may support user plane traffic for one or more wireless devices.

Figure 15:
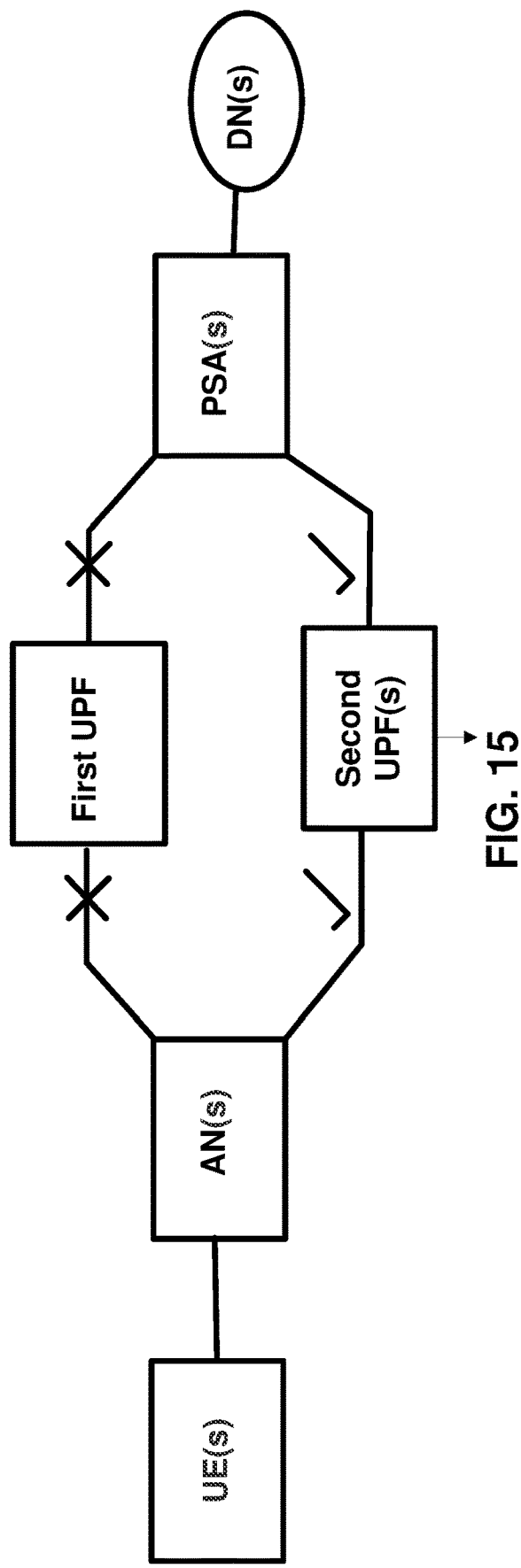
FIG. 15 is an example network scenario depicting transfer of UPF sessions from the first UPF to the second UPF when there is no additional intermediate user plane function present between access network and PDU session anchor UPF as per an aspect of an embodiment of the present disclosure. In this scenario, the first UPF is directly connected with the access network and the PDU session anchor UPF.

FIG. 15 may be an example network scenario depicting transfer of UPF sessions from the first UPF to a second UPF when there is no additional intermediate UPF present between the access network and the PDU session anchor (PSA) UPF per an aspect of an example embodiment of the present disclosure. As depicted in FIG. 15, the first UPF may directly connect with the access network and the PSA UPF. The communications between the access node (e.g. radio access network, NR RAN, base station, gNB, and/or eNB) and an SMF may be transferred via an AMF.

Figure 16:
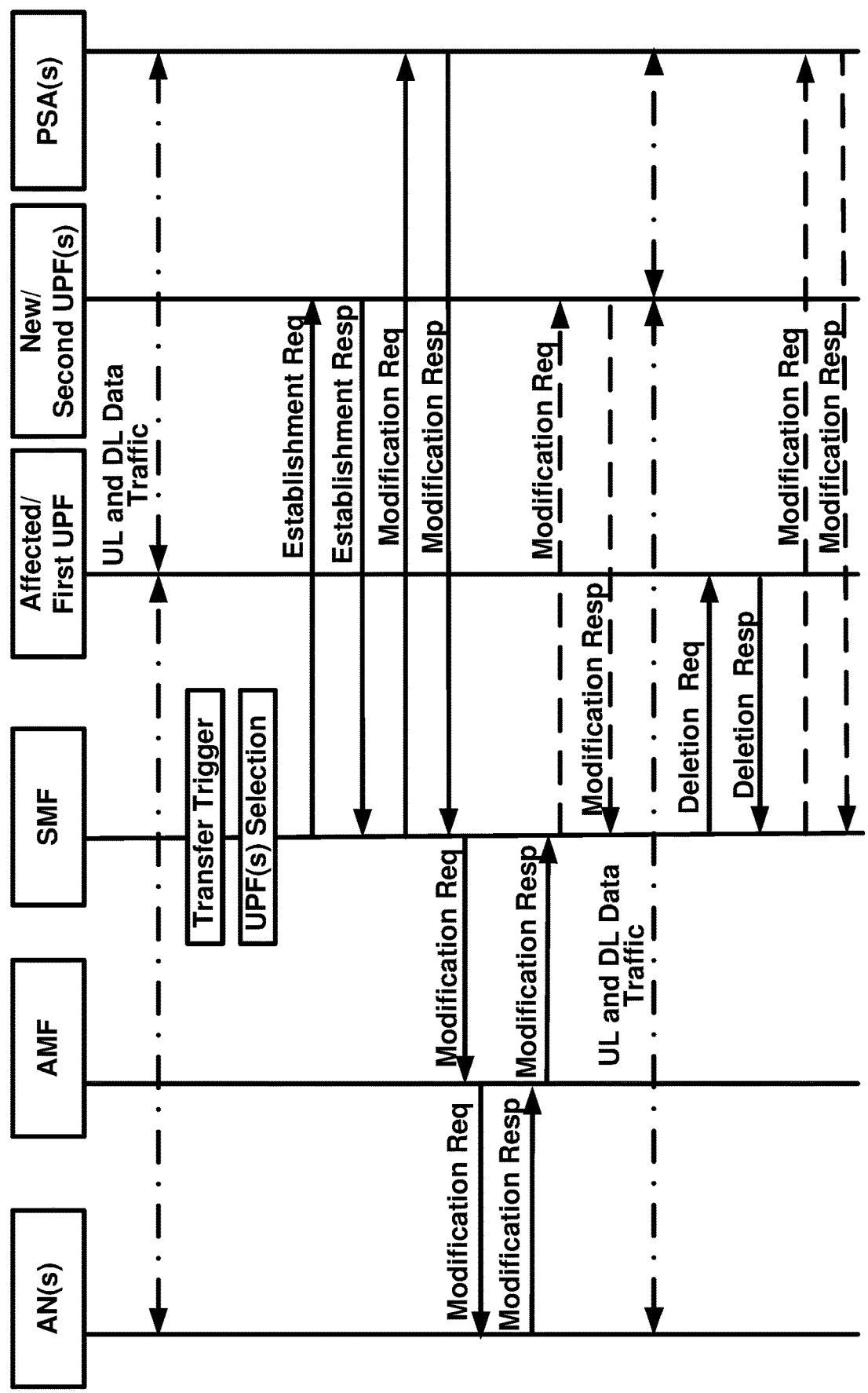
FIG. 16 is an example call flow diagram for the scenario depicted in FIG. 15.

An example FIG. 16 illustrates an example call flow of the network scenario depicted in FIG. 15. In an example embodiment, user plane traffic of one or more UPF sessions of one or more wireless devices may be established. Uplink and/or downlink data traffic for one or more UPF sessions of one or more wireless devices may be transmitted via the first UPF in uplink and/or downlink direction. In an example, a SMF may receive at least one indication from a first network function. In an example, the at least one indication may be for the first UPF. In an example, the at least one indication may indicate that a transfer of UPF sessions from the first UPF may be required. In an example, the at least one indication may indicate that the transfer of UPF session may be needed at the first UPF due to maintenance, overloading, congestion, exceeding a threshold for the number of UPF sessions, exceeding a threshold for the number of wireless devices, and/or the like.

In an example embodiment, the first network function may be the first UPF, an operation and maintenance function OAM, a policy control function (PCF), and/or the like.

Based on at least one indication, the SMF may determine sessions of the first UPF to be transferred. The session of the first UPF may associate with one or more wireless devices.

In an example embodiment, the at least one indication may comprise a first parameter indicating a request for transferring sessions of one or more UPFs, a second parameter comprising traffic load information of one or more sessions of the first UPF, a third parameter comprising node information of the first UPF, and/or the like.

In an example, the first parameter received from the first network function may comprise at least one of a UPF identifier of the first UPF (e.g., UPF ID, UPF address, UPF IP address, UPF FQDN, and/or the like), the session identifiers of sessions to be transferred (e.g., N4 session ID, UPF session ID, PFCP session ID, and/or the like), fully qualified connection set identifier (FQ-CSID), location information of the first UPF, a data network name of the first UPF, a packet data unit session type(s) (e.g., IPv4, IPv6, Ethernet, unstructured, and/or the like), one or more quality of services, a single network slice selection assistance information(s) (S-NSSAI), a data network access identifier of the first UPF, and/or the like.

In an example, the second parameter received from the first network function may comprise at least one of a session identifier (e.g., session identifier or fully qualified session identifier assigned by the SMF, session identifier or fully qualified session identifier assigned by the first network function, and/or the like), FQ-CSID, a usage report, an error indication report, load control information, overload control information and/or an additional usage reports information.

In an example embodiment, when the at least one indication is received from the first network function, the at least one indication may be via the N4 interface. The at least one indication, may employ a reporting procedure (e.g., Packet Forwarding Control Protocol, PFCP reporting, N4 reporting, N4 session reporting, PFCP session reporting, and/or the like). In an example, a PFCP load control procedure may be employed. The PFCP load control may enable the first network function to send its load information to the SMF to adaptively balance the PFCP session load across the UPFs it controls according to their effective load. The load information may reflect the operating status of the resources of the UPF. In an example, load control may balance PFCP session load. In an example, load control and overload control may be supported and activated in the network, based on operator's policy.

In an example, when providing load control information in a message, the first network function may include the set of load control information, i.e. all the node level instance of the load control information, even if only a subset of the load control information has changed. The load control sequence number may increment whenever the load control information is changed. The load control information may link to the node identifier (i.e. FQDN or the IP address used during the first UPF selection) of the first network function providing the Information.

The SMF may overwrite any stored load control information of the first UPF in the SMF with the newly received load control information from the same peer node if the new load control information is more recent than the old information as indicated by the load control sequence number.

In an example embodiment, the first network function (e.g., the first UPF, OAM, PCF, operations support systems (OSS), and/or the like) may send an indication to the SMF by an N4 report procedure. If the N4 report procedure is employed, the first network function may use the N4 node report procedure to report information to the SMF (e.g. to report a user plane path failure affecting all the N4 sessions towards a remote GTP-U peer, a user plane load, a user plane congestion report, and/or the like). In an example, the first network function may detect that an event may be reported to the SMF and may start the procedure by sending an N4 report message (e.g., comprising an identifier of the UPF (UPF ID), list of [event, status], and/or the like) to the SMF. The SMF may respond with an N4 report ack message (e.g., comprising a SMF identifier, SMF IP address, and/or the like). The event parameter may comprise the name of the event, identifier of the first UPF, and/or the like. The status parameter may comprise the information that the SMF may require.

In an example, the at least one indication may employ by the first network function to the SMF by sending GTP error indication message, comprising at least a remote F-TEID and/or tunnel endpoint identifier data I parameters, and/or the like. In an example, the first UPF may deploy this message over the N4 interface (e.g. using PFCP protocol or like) to the SMF in standalone manner and/or piggybacked in to another message sent over the N4 interface, and/or the like.

In an example, a usage report sent by the first UPF to the SMF may be set based on specific event triggering or requested periodically. This report may contain duration of the report (start and end time), usage information indicating whether the usage is reported for the period before or after monitoring time, or before or after QoS enforcement, volume measurement, time of first and last packet received, volume and duration of the measurement and information on Ethernet traffic.

In an example, the load control parameter sent by the first UPF to the SMF includes a load metric which may indicate the current load level of the first UPF. The first UPF may consider various aspects, such as the used capacity of the first UPF, the load in the first UPF (e.g. memory/CPU usage in relationship to the total memory/CPU available, etc.). The load metric represents the current load level of the first UPF as a percentage within the range of 0 to 100, where 0 means no or 0% load and 100 means maximum or 100% load reached which may refer as no further load is desirable. There may be a threshold set at the SMF which may influence decision taken at the SMF such as accepting new UPF session requiring specific QoS once threshold is reached at 70%.

In an example, the frequency of receiving load information at the SMF may be implementation specific or specified at the SMF using the provisioned load control information.

In an example, an overload control information sent from the first UPF to the SMF may comprise a period of validity, an overload reduction matrix, a report frequency, and/or the like for sending reports to the SMF. The period of validity may indicate the length of time during which the overload condition specified by this parameter is to be considered as valid. Overload reduction matrix may comprise a value in the range of e.g., 0 to 100 which indicates the percentage of traffic reduction of the overload control information requests the SMF may apply for the first UPF. An Overload Reduction Metric of 0 may indicate that the UPF is not in overloaded. How often or when the first UPF may need to include the overload control information is implementation specific. In an example, this information may be provisioned at the SMF or at the first UPF.

In an example embodiment, the first UPF may send an error indication report when it determines failure at a peer network function. This report may comprise remote F-TEID and the tunnel endpoint identifier data I parameters. Based on these parameters, the SMF may determine impacted sessions of the first UPF. In an example, it may make decision to transfer these UPF sessions to the new UPF. In an example, the SMF may deactivate the session and/or request the wireless device to initiate reactivation procedure, and/or the like.

In an example, the SMF may make decision to transfer one or more UPF sessions from the first UPF to the second UPF based on information received from the first UPF. In an example, the SMF may determine to transfer one or more sessions of the first UPF to the second UPFs based on a user plane path failure, usage report for one or more sessions, a report on the overload status of the first UPF, and/or the like.

In an example embodiment, the first network function may provide a number of sessions to be transferred to the second UPF to the SMF. In an example, the SMF may determine to transfer sessions based on the information or indication that the SMF may receive from other network function(s) (e.g. PCF, UDM).

The SMF may employ a priority mechanism the UPF sessions to transfer (e.g. deactivated UPF sessions not engaged in a Service Request or based on operator's policy, based on QoS class identifier (QCI) and/or data network name (DNN), and/or the like). In an example, the SMF may employ the priority mechanism for transferring UPF sessions per DNN, if received from a unified data management (UDM), and if permitted per a service level agreements (SLA) for in-bound roamers, to determine the relative transfer priority among sessions to the same DNN. The SMF may employ a locally configured value as a default transfer priority if a transfer priority for a session is not received from the UDM or not permitted by the SLA for in-bound roamers. In an example, the SMF may interact with a policy control function (PCF) to obtain a transfer priority information e.g., over N7 interface. The priority information may be retrieved during the session establishment request received from a wireless device or when an existing session is modified, and/or the like. In an example, the transfer policy may be stored/provisioned at the UDM as a part of a subscriber policy or it may be derived by the first network function (e.g. PCF or the like) based on available information.

In an example, the first network function may send the third parameter. The third parameter may comprise at least one of a node identifier of the first UPF (e.g., UPF ID, UPF address, UPF IP address, UPF FQDN, and/or the like), a node report type (e.g. type indicating a usage report, an error indication report, load control information, overload control information and/or an additional usage reports information, and/or the like), a user plane path failure report, a usage report for sessions, or an overload report, and/or the like.

In an example, the user plane path failure report may comprise at least one of an IP address of the UPF (e.g., the first UPF) towards which a user plane path failure has been detected by the first network function. In an example, the first network function may send to the SMF, the user plane path failure report over the N4 interface using PFCP protocol, N4 reporting procedure, and/or the like. The first network function may send user plane path failure report in the PFCP node report request to the SMF.

In an example, if the identifier of the second UPF is not provided to the SMF, the SMF may select the second UPF based of at least one parameters (e.g. UPF identifier, UPF address, UPF IP address, UPF FQDN and/or like), location information of the second UPF, a data network name of the first UPF, a packet data unit session type supported by the second UPF (e.g., IPv4, IPv6, Ethernet, unstructured, and/or the like), one or more quality of services, a single network slice selection assistance information (S-NSSAI) supported by the second UPF, a data network access identifier of the first UPF, current load condition of the second UPF, total number of UPF sessions currently served by the second UPF and/or the like.

In an example, the second UPF may be a UPF configured in the network or the UPF which may be serving data traffic for other wireless devices (UEs).

In an example, the SMF may send a request to a network routing/repository function (NRF) to provide the identities of the second UPF. The request to the NRF from the SMF may comprise location information of the first UPF, a data network name supported by the first UPF, a packet data unit session type supported by the first UPF (e.g., IPv4, IPv6, Ethernet, unstructured, and/or the like), one or more quality of services, a single network slice selection assistance information (S-NSSAI) supported by the first UPF, a data network access identifier of the first UPF, and/or the like. In the response from the NRF may include at least one second UPF identity.

In an example embodiment, a second network function may be an egress network function or a PSA UPF.

In an example embodiment, a third network function may be an ingress network function or an access network (AN).

In an example, whether to assign IP address and tunnel identifiers at the SMF or UPF may be decided as a part of network provisioning at the SMF. In an example, the SMF and/or the UPF may assign/allocate IP addresses, tunnel endpoint identifiers, and/or the like.

In an example, the UPF sessions requested to be transferred to the second UPF from the first UPF may be referred as "targeted UPF sessions".

In an example, the SMF may allocate a fully runnel endpoint identifier (F-TEID) of the PDR(s) sent in a session establishment request or request the second UPF to allocate the F-TEID of the PDR(s).

The SMF may request the second UPF to allocate the F-TEID when a session establishment request is sent to the second UPF. In an example, this is done by setting the choose flag in the F-TEID of PDR(s) to be created with a new F-TEID and setting the choose id field of the F-TEID, for the PDR(s) to be created with the same F-TEID, with the same choose ID value. In another example, the SMF may include the F-TEID only in the create traffic endpoint parameter and set the choose flag in the F-TEID of that parameter. A traffic endpoint id (TEID) parameter may be included in all the PDRs to be created with the same F-TEID.

In an example, the SMF may send a first message to the second UPF indicating an establishment request of the targeted UPF sessions. In an example, the first message may comprise session identifiers of the targeted UPF sessions.

In an example, the first message may be sent to the second UPF over the N4 interface using PFCP protocol, via N4 reporting procedures, and/or the like. The first message may comprise list of targeted UPF sessions. The targeted UPF sessions include fully qualified session id assigned by the SMF, a create traffic endpoint, an FQ-CSID of the SMF, a creation of packet detection rules, a creation of forwarding action rules, a creation of usage reporting rules, a creation of QoS enforcement rules, a creation of buffering action rules, a packet connection type, a user identifier and a user plane inactivity timer, and/or like.

In an example call flow illustrated in FIG. 16, in the first message, the SMF may send an FQ-CSID of the access network and an FQ-CSID of the PSA UPF to the second UPF.

In an example call flow illustrated in FIG. 18, in the first message, the SMF may send an FQ-CSID of the access network and an FQ-CSID of the second network function connected to the first UPF to the second UPF.

Figure 20:
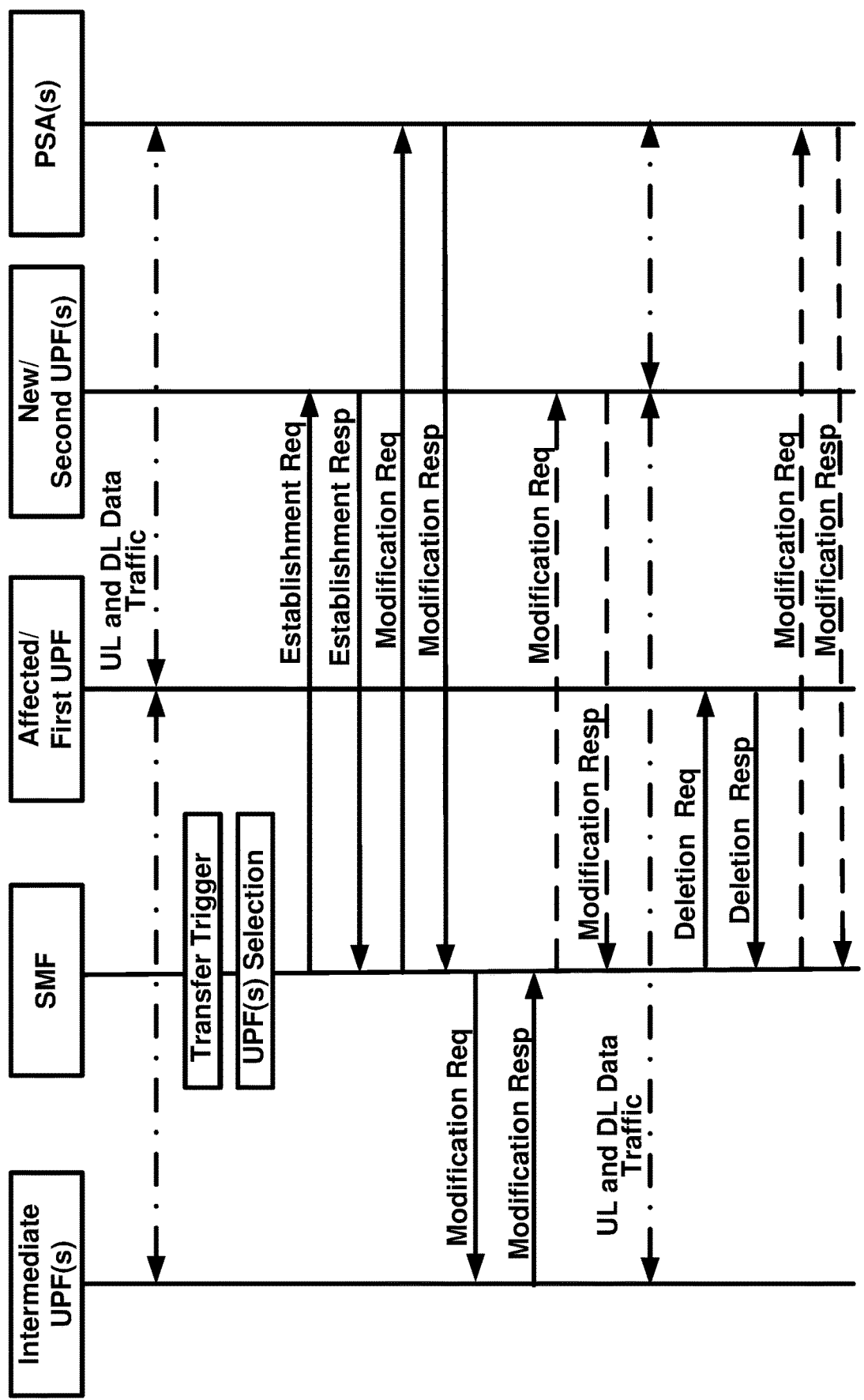
FIG. 20 is an example call flow diagram for the scenario depicted in FIG. 19.

In an example call flow illustrated in FIG. 20, in the first message, the SMF may send an FQ-CSID of the third network function connected to the first UPF and the FQ-CSID of the PSA UPF to the second UPF.

Figure 22:
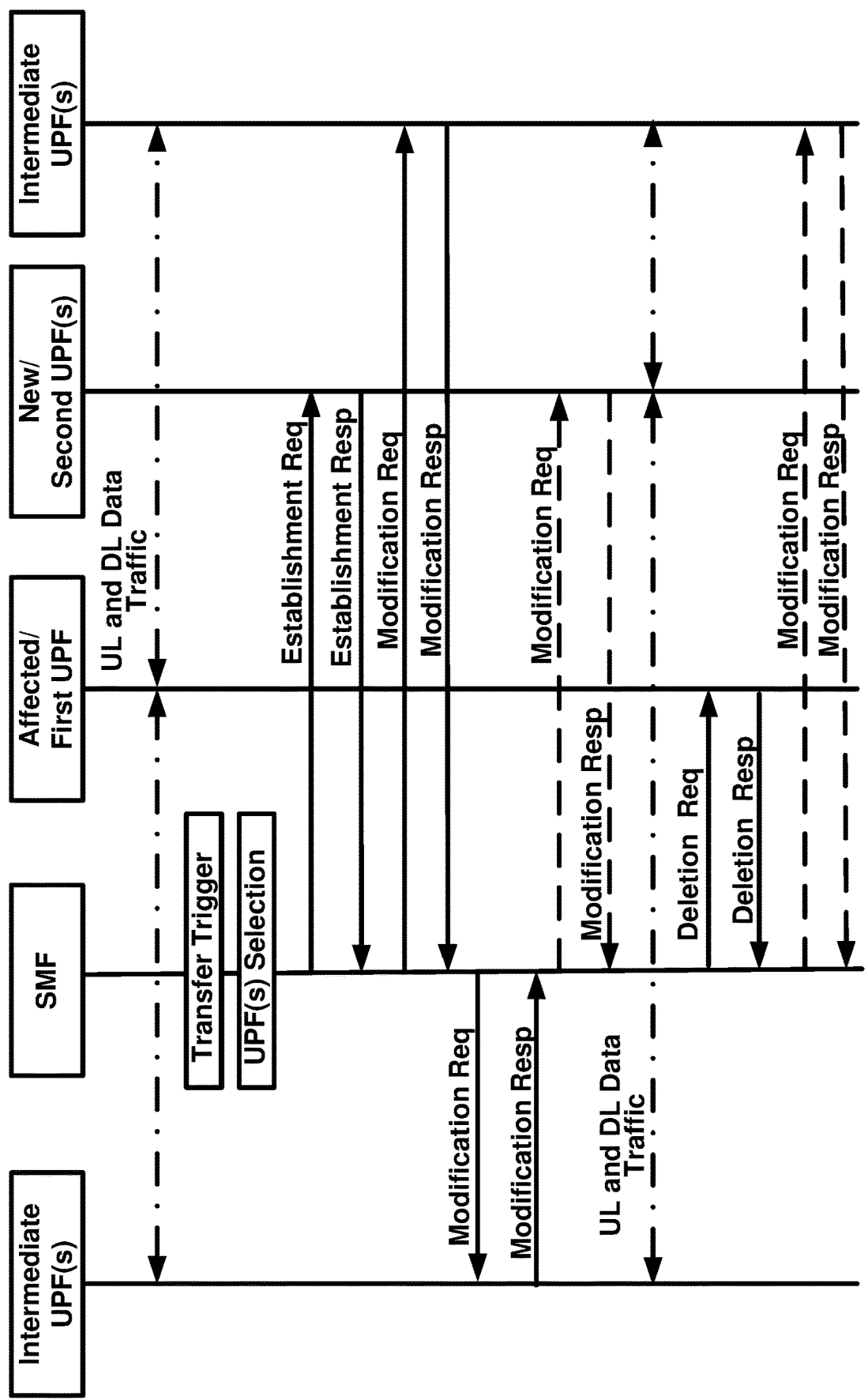
FIG. 22 is an example call flow diagram for the scenario depicted in FIG. 21.
Figure 23:
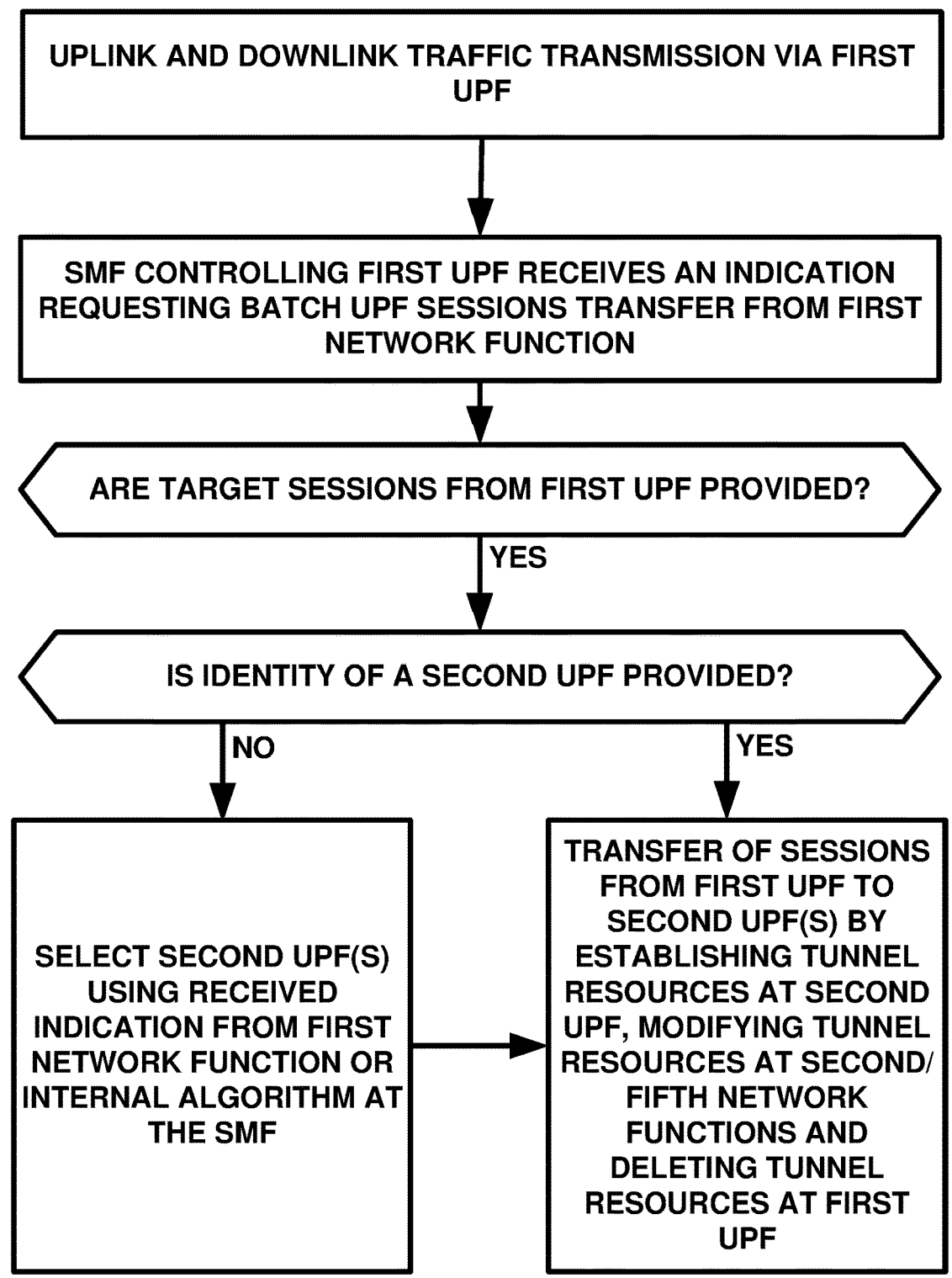
FIG. 23 is an example call flow detailing overall steps involved in identifying sessions to be transferred, selection of the second UPF(s) and transfer of sessions from the first UPF to the second UPF(s) as per an aspect of an embodiment of the present disclosure.
Figure 24:
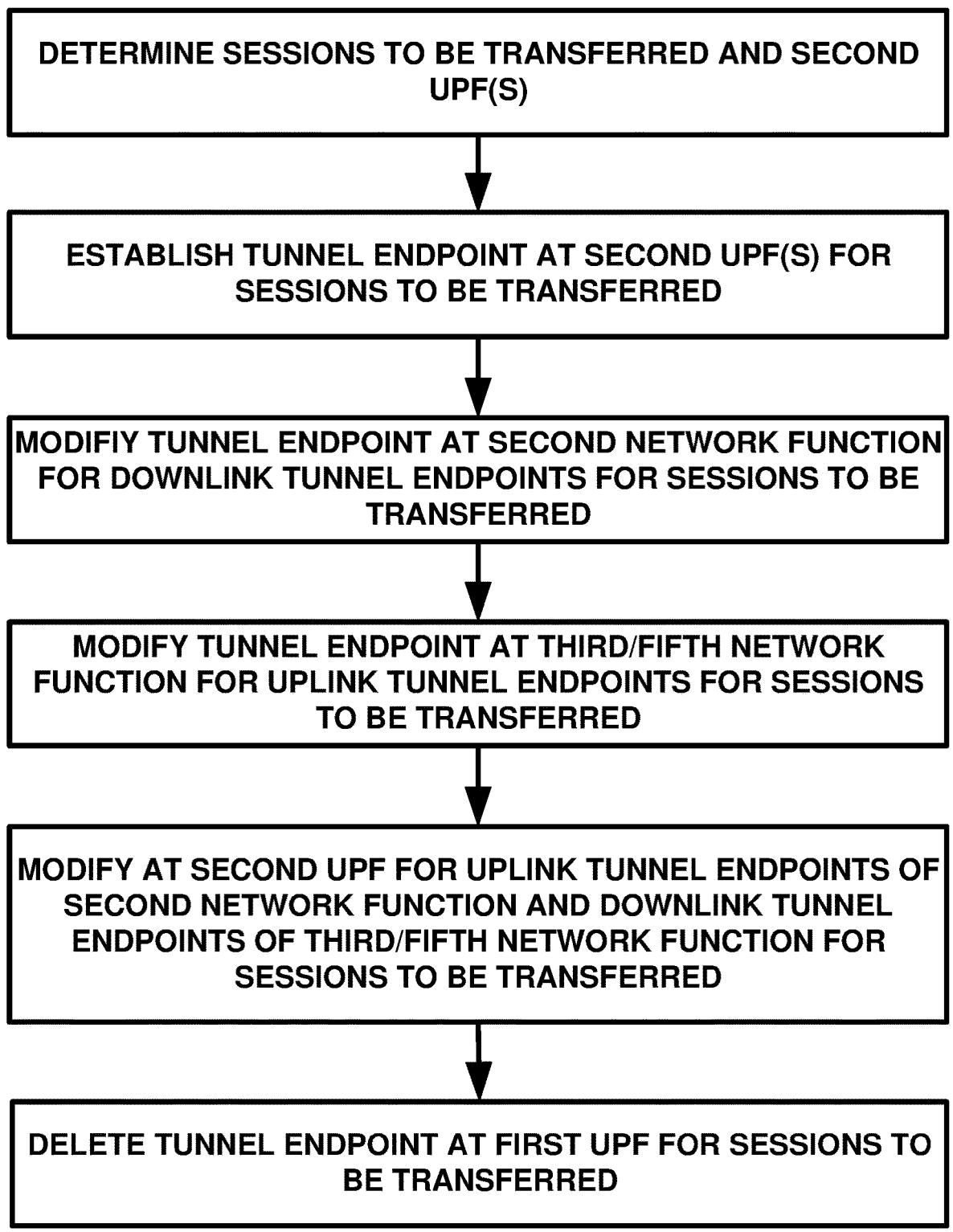
FIG. 24 is an example call flow detailing sequence of operations involved in UPF sessions transfer from the first UPF to the second UPF(s) as per an aspect of an embodiment of the present disclosure.

In an example call flow illustrated in FIG. 22, in the first message, the SMF may send the FQ-CSID of the third network function and the FQ-CSID of the second network function which are connected to the first UPF to the second UPF.

In an example, the second UPF may send a second message indicating a result of the establishment request of the targeted UPF sessions to the SMF where the second message may comprise at least one of uplink F-TEIDs and/or downlink F-TEIDs for the targeted UPF sessions if they are allocated by the UPF. In the second message, the SMF may receive a list of UPF sessions which may have failed establishment of tunnel endpoint(s) at the second UPF.

In an example, the second message may comprise a node identifier of the UPF, a list of result for the targeted UPF sessions where information of PDF session contains a cause indicating the acceptance or the rejection of the corresponding session, session identifier allocated by the user plane function, created PDR(s), load control information, overload control information, FQ-CSID of the second UPF, failed rule identifier and/or created traffic endpoint, and/or the like. For failed PDF sessions, it may include the cause and impacted parameter. In the second message, the SMF may receive a list of UPF sessions from the second UPF which may have failed allocating downlink fully qualified tunnel endpoint or uplink fully qualified tunnel endpoint at the second UPF.

In an example, the SMF may send a third message to the first UPF indicating release of at least one of targeted UPF sessions where the third message comprises session identifiers of the targeted UPF sessions. The third message may be sent over the N4 interface using PFCP protocol and/or the like.

In an example, the first UPF may release at least one of the targeted UPF sessions when the request of release of the targeted UPF sessions is received from the SMF.

In an example, a fourth message indicating a response of the third message is sent to the SMF from the first UPF. The fourth message may comprise a cause, an offending information element, a load information, an overload information and a usage report, and/or the like for the targeted UPF sessions in the third message.

In an example, the SMF may send a fifth message to the second network function for modification of the existing targeted UPF sessions. The fifth message may comprise a downlink fully qualified tunnel endpoint identifiers received from the second UPF for the targeted UPF sessions.

In an example, the fifth message may be sent over the N4 interface using PFCP protocol and/or the like. Information of the targeted UPF sessions may comprise a remove traffic endpoint, a create traffic endpoint, an update traffic endpoint, a delete or an update of previously provided rules (a packet detection rules, a forwarding action rules, a usage reporting rules, a QoS enforcement rules and a buffering action rules). In the fifth message, the SMF may include list of UPF sessions which may have failed establishment of tunnel endpoint(s) at the second UPF. These sessions may be released by the second network function.

In response to the fifth message, the second network function may send a sixth message to the SMF comprising an uplink fully qualified tunnel endpoint identifier of the second network function for the targeted UPF sessions.

In an example, for the targeted UPF sessions, the sixth message may comprise a cause, an offending information element, a created PDR, a load control information, an overload control information, a usage report, a failed rule id, an additional usage reports information, a created/updated traffic endpoint, and/or the like. In the sixth message, the SMF may receive a list of UPF sessions the second network function which may have failed modification of tunnel endpoint(s) at the second network function.

The SMF may sends a seventh message to the third network function for modification of the existing targeted UPF sessions. This message comprises an uplink fully qualified tunnel endpoint identifiers received from the second UPF for the targeted UPF sessions.

In an example, the seventh message may be sent over the N4 interface using PFCP protocol and/or the like. Information of the targeted UPF sessions may comprise a remove traffic endpoint, a create traffic endpoint, an update traffic endpoint, a delete or an update of previously provided rules (a packet detection rules, a forwarding action rules, a usage reporting rules, a QoS enforcement rules and a buffering action rules). In the seventh message, the SMF may include list of UPF sessions which may have failed modification of tunnel endpoint(s) at the second UPF and/or the second network function. These sessions may be released by the third network function.

In response to the seventh message, the third network function may send an eighth message to the SMF comprising a downlink fully qualified tunnel endpoint identifier of the third network function for the targeted UPF sessions.

In an example, for the targeted UPF sessions, the eighth message may comprise a cause, an offending information element, a created PDR, a load control information, an overload control information, a usage report, a failed rule id, an additional usage reports information, a created/updated traffic endpoint, and/or the like. In the eighth message, the SMF may receive a list of UPF sessions which may have failed modification of tunnel endpoint(s) at the third network function.

The SMF may sends a ninth message to the second UPF for modification of the existing targeted UPF sessions. This message may comprise an uplink fully qualified tunnel endpoint identifier of the second network function and/or a downlink fully qualified tunnel endpoint identifier of the third network function for the targeted UPF sessions.

In an example, the ninth message may be sent over an N4 interface using PFCP protocol and/or the like. Information of the targeted UPF sessions may comprise a remove traffic endpoint, a create traffic endpoint, an update traffic endpoint, a delete or an update of previously provided rules (a packet detection rules, a forwarding action rules, a usage reporting rules, a QoS enforcement rules and a buffering action rules). In the ninth message, the SMF may include list of sessions which may have failed modification of tunnel endpoint(s) at the third network function. These sessions may be released by the second UPF.

In response to the ninth message, the second UPF may send a tenth message to the SMF.

In an example, for the targeted UPF sessions, the tenth message may comprise a cause, an offending information element, a created PDR, a load control information, an overload control information, a usage report, a failed rule id, an additional usage reports information, a created/updated traffic endpoint, and/or the like.

In an example embodiment, a fourth network function may be an access and mobility management function (AMF). Communication between the access network (AN) and the SMF may be via the fourth network function.

In an example embodiment, a fifth network function may be an access network (e.g., NG-RAN, RAN, non-3GPP access, and/or the like).

The SMF may sends an eleventh message to the fourth network function for modification of the existing targeted UPF sessions. This message comprises an uplink fully qualified tunnel endpoint identifiers received from the second UPF for the targeted UPF sessions.

In an example, the eleventh message may be sent over an N11 interface using protocol based on HTTP, JSON, REST, HTTP-based solution set and/or like. Information of the targeted UPF sessions may comprise a remove traffic endpoint, a create traffic endpoint, an update traffic endpoint, a delete or an update of previously provided rules (a packet detection rules, a forwarding action rules, a usage reporting rules, a QoS enforcement rules and a buffering action rules). In the eleventh message, the SMF may include list of UPF sessions which may have failed modification of tunnel endpoint(s) at the second UPF and/or the second network function. The fourth network function may forward the eleventh message to the fifth network function (e.g., the thirteenth message). In an example, the thirteenth message may be over an N2 interface using SCTP application protocol (e.g. a variant of S1-MME) and/or the like.

In response to the eleventh message, the SMF may receive a twelfth message comprising a downlink fully qualified tunnel endpoint identifier of the fifth network function for the targeted UPF sessions. In an example, the fourth network function may forward the twelfth message to the SMF over the N11 interface using protocol based on HTTP, JSON, REST, HTTP-based solution set and/or like. In the twelfth message, the SMF may receive a list of UPF sessions which may have failed modification of tunnel endpoint(s) at the fifth network function.

The fourth network function may forward a thirteenth message to the fifth network function for modification of the existing targeted UPF sessions. This message comprises an uplink fully qualified tunnel endpoint identifiers received from the second UPF for the targeted UPF sessions. The thirteenth message may include list of UPF sessions which may have failed modification of tunnel endpoint(s) at the second UPF and/or the second network function. These sessions may be released by the fifth network function.

In response to the thirteenth message, the fifth network function may send a fourteenth message to the fourth network function comprising a downlink fully qualified tunnel endpoint identifier of the fifth network function for the targeted UPF sessions. In an example, the fifth network function may send the fourteenth message over the N2 interface using SCTP application protocol (e.g. variant of S1-MME) and/or the like to the fourth network function.

In an example, for the targeted UPF sessions, the fourteenth message may comprise a cause, an offending information element, a created PDR, a load control information, an overload control information, a usage report, a failed rule id, an additional usage reports information, a created/updated traffic endpoint, and/or the like. In the fourteenth message, the fifth network function may send a list of UPF sessions which may have failed modification of tunnel endpoint(s).

In an example, the fourth network function may forward the fourteenth message to the SMF as the twelfth message over the N11 interface using protocol based on HTTP, JSON, REST, HTTP-based solution set and/or like.

The SMF may sends a fifteenth message to the second network function for modification of the existing targeted UPF sessions which may have failed modification of the tunnel endpoints at the third network function. This message may comprise a list of session identifiers of failed sessions.

In an example, the fifteenth message may be sent over the N4 interface using PFCP protocol and/or the like. Information of the targeted UPF sessions may comprise a remove traffic endpoint, a create traffic endpoint, an update traffic endpoint, a delete or an update of previously provided rules (a packet detection rules, a forwarding action rules, a usage reporting rules, a QoS enforcement rules and a buffering action rules). These sessions may be released by the second network function.

In response to the fifteenth message, the second network function may send a sixteenth message. In an example, the sixteenth message indicating a response of the fifteenth message is sent to the SMF from the second network function. The sixteenth message may comprise a cause, an offending information element, a load information, an overload information and a usage report, and/or the like for the UPF sessions received in the fifteenth message.

In an example embodiments, messages over the N4 interface, the N2 interface and/or the N11 interface may comprise more than one information element with the same type within the same message.

In an example embodiment, messages over the N4 interface, the N2 interface and/or the N11 interface may be defined as separate messages or they may be piggybacked with one or more messages.

In an example embodiment, messages over the N4 interface, the N2 interface and/or the N11 interface may be fragmented in one or more messages.

FIG. 14 is an example depicting network scenario where one or more intermediate UPFs may be present between access network and the first UPF and between the first UPF and PDU session anchor as per an aspect of an embodiment of the present disclosure. This example may depict that there may be one or more than one wireless device, one or more than one access networks, one or more than one intermediate UPFs and/or one or more than one PSA UPF may be associated with the list of UPF sessions which are requested to be transferred from the first UPF to the second UPF (targeted UPF sessions).

FIG. 15 is an example network scenario depicting transfer of UPF sessions from the first UPF to the second UPF when there is no additional intermediate UPF(s) present between access network and PDU session anchor. In this scenario, the first UPF is directly connected with the access network (fifth network function) and the PDU session anchor UPF (second network function). The SMF communicates with the fifth network function via an AMF (fourth network function).

FIG. 16 is an example call flow diagram for the scenario depicted in FIG. 15. In this example call flow, it is depicted that the first UPF is having one or more UPF sessions at the time of receipt of indication for sessions transfer from the first network function. In an example, the SMF may determine sessions to be transferred and it may initiate session establishment procedure with the second UPF by sending the first message for all targeted sessions. The SMF may receive the second message as a response of the first message from the second UPF which may comprise uplink fully qualified tunnel endpoint and downlink fully qualified tunnel endpoint for the requested UPF sessions from the SMF. The second UPF may include sessions for which tunnel endpoint establishment have failed in the second message.

In an example, the SMF may send the fifth message to the second network function requesting session modification from the second network function along with the allocated downlink fully qualified tunnel endpoints for the targeted UPF sessions from the second UPF. It may include list of failed sessions received from the second UPF, requesting the second network function to release them.

In an example, the second network function may modify tunnel endpoints of received targeted sessions and may release failed sessions. It may send the sixth message as a response of the session modification to the SMF along with the allocated uplink fully qualified tunnel endpoints for the targeted UPF sessions. If session modification is failed for one or more requested sessions, a list of those sessions is included in the sixth message.

In an example, the SMF may send the eleventh message requesting session modification from the fourth network function along with the allocated uplink fully qualified tunnel endpoints for the targeted UPF sessions from the second UPF. It may include list of failed sessions received from the second UPF and/or the second network function.

In an example, the fourth network function forwards the eleventh message to the fifth network function as the thirteenth message.

In an example, the fifth network function may modify tunnel endpoints of received targeted sessions of the thirteenth message and may release failed sessions if received in this message. It may send the fourteenth message as a response of the session modification to the fourth network function along with the allocated downlink fully qualified tunnel endpoints for the targeted UPF sessions. If session modification is failed for one or more requested sessions, list of those sessions may be included in the fourteenth message.

In an example, the fourth network function forwards the fourteenth message to the SMF as the twelfth message.

In an example, the SMF may send the ninth message to the second UPF requesting session modification of downlink fully qualified tunnel endpoints of the fifth network function and uplink fully qualified tunnel endpoints of the second network function for the targeted UPF sessions. It may include list of failed sessions received from the fifth network function (received via fourth network function), requesting the second UPF to release them.

In an example, the second UPF may modify tunnel endpoints of received targeted sessions and may release failed sessions if they are received in the ninth message. It may send the tenth message as a response of the session modification to the SMF.

In this example, the user traffic may now be transmitted via the second UPF in uplink and downlink directions.

In an example, the SMF may send the third message to the first UPF for releasing all sessions of the targeted UPF sessions. This message may comprise the list of session identifiers of targeted UPF sessions.

In an example, the first UPF responds to the SMF by sending the fourth message indicating result of the session release of requested sessions.

In an example, the SMF may send the fifteenth message to the second network function which may comprise list of failed sessions received from the fifth network function (received via fourth network function), requesting the second network function to release them.

In an example, the second network function may release failed sessions if they are received in the fifteenth message. It may send the sixteenth message as a response of the session modification to the SMF.

Figure 17:
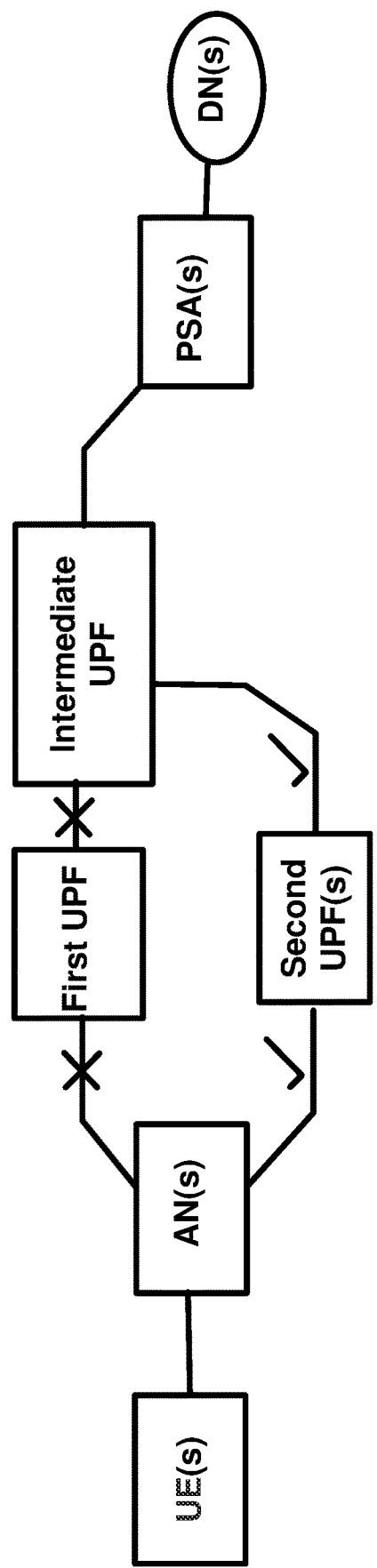
FIG. 17 is an example network scenario depicting transfer of UPF sessions from the first UPF to the second UPF when there are one or more additional intermediate user plane functions present between the PDU session anchor UPF and the first UPF as per an aspect of an embodiment of the present disclosure. The first UPF is directly connected to the access network in this scenario.
Figure 16:
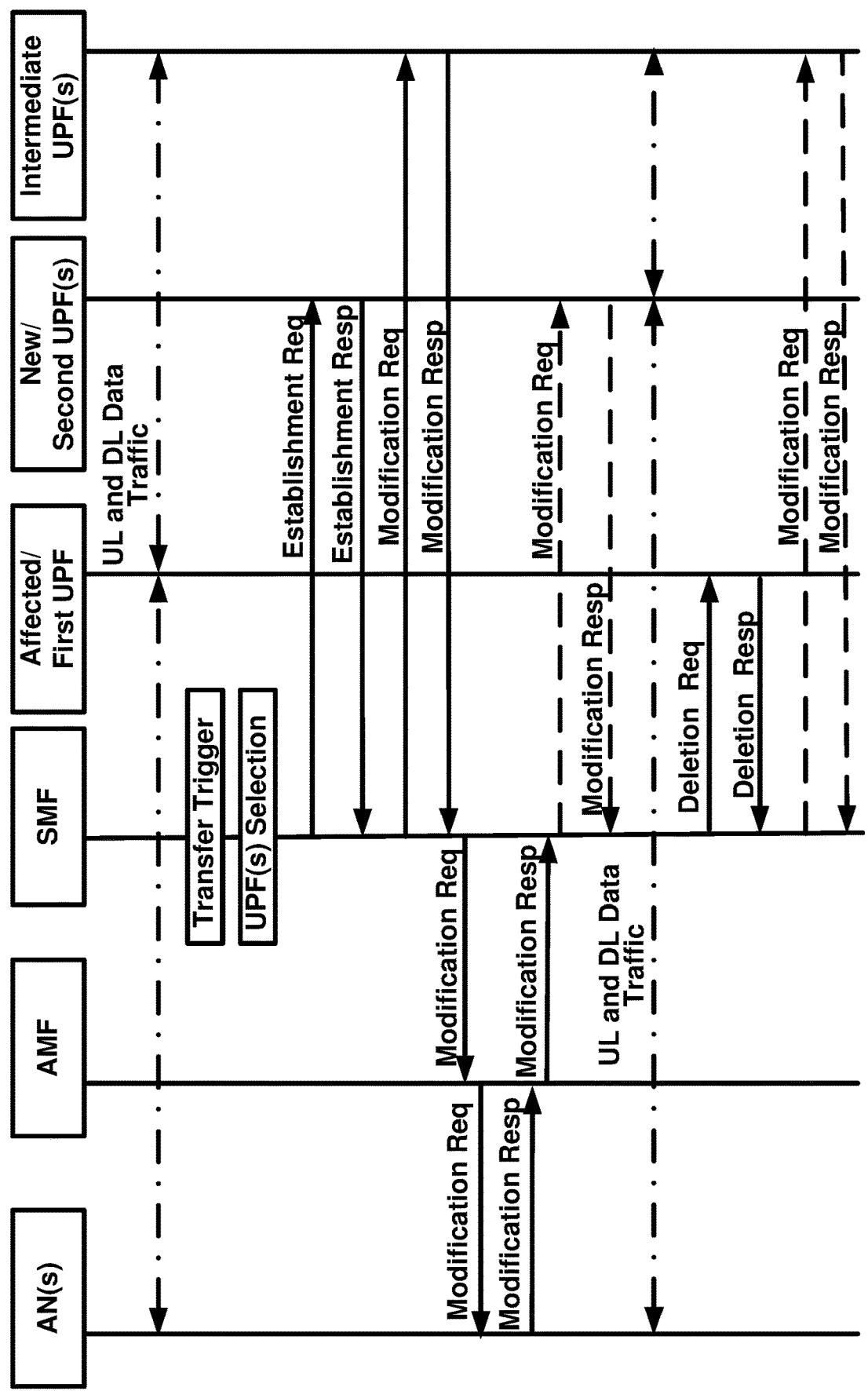

FIG. 17 is an example network scenario depicting transfer of UPF sessions from the first UPF to the second UPF when there are one or more additional intermediate UPFs present between the PSA UPF and the first UPF as per an aspect of an embodiment of the present disclosure. The first UPF is directly connected to the access network (fifth network function) and intermediate UPF (second network function) in this scenario. The SMF communicates with the fifth network function via an AMF (fourth network function).

FIG. 18 is an example call flow diagram for the scenario depicted in FIG. 17. Call flow details for example call flow in FIG. 16 may be the same as described for example call flow depicted in FIG. 18.

Figure 19:
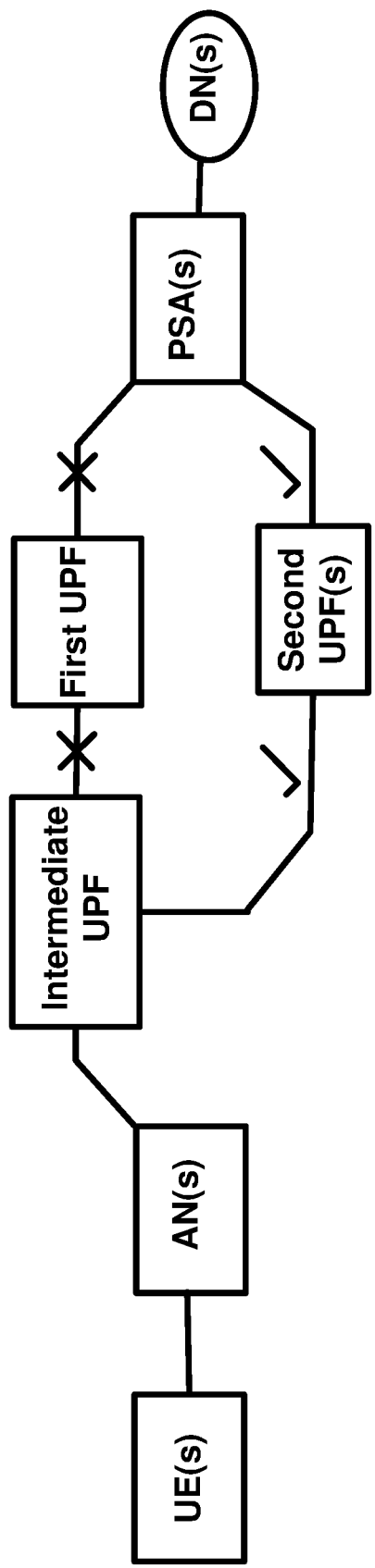
FIG. 19 is an example network scenario depicting transfer of UPF sessions from the first UPF to the second UPF when there are one or more additional intermediate UPFs present between access network and the first UPF as per an aspect of an embodiment of the present disclosure. The first UPF is directly connected to the PDU session anchor UPF in this scenario.

FIG. 19 is an example network scenario depicting transfer of UPF sessions from the first UPF to the second UPF when there are one or more additional intermediate UPFs present between access network and the first UPF as per an aspect of an embodiment of the present disclosure. The first UPF is directly connected to the PSA UPF (second network function) and intermediate UPF (third network function) in this scenario.

FIG. 20 is an example call flow diagram for the scenario depicted in FIG. 19. In this example call flow the SMF may communicates with the third network function instead of the fourth network function once the second message from the second UPF may be received.

In an example, the SMF may send the seventh message to the third network function requesting session modification along with the allocated uplink fully qualified tunnel endpoints for the targeted UPF sessions from the second UPF. It may include list of failed sessions received from the second UPF, requesting the third network function to release them.

In an example, the third network function may modify tunnel endpoints of received targeted sessions and may release failed sessions if they are received from the SMF. It may send the eighth message as a response of the session modification to the SMF along with the allocated uplink fully qualified tunnel endpoints for the targeted UPF sessions. If session modification is failed for one or more requested sessions, a list of those sessions is also included in the eighth message.

All other procedures detailed in an example call flow of FIG. 16 may be the same as described for example call flow depicted in FIG. 20.

Figure 21:
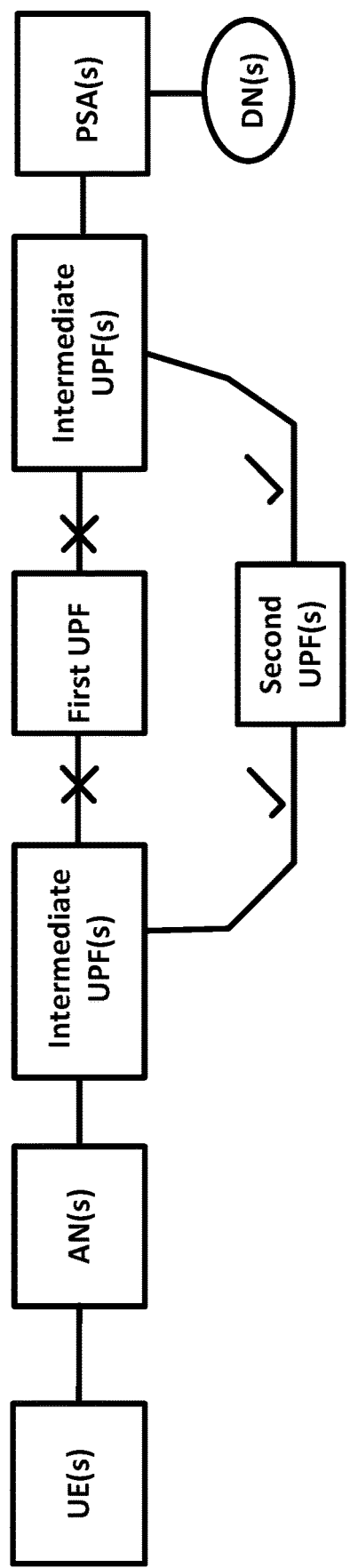
FIG. 21 is an example network scenario depicting transfer of UPF sessions from the first UPF to the second UPF when there are one or more additional intermediate user plane functions present between the PDU session anchor UPF and the first UPF and between the first UPF and access network as per an aspect of an embodiment of the present disclosure.

FIG. 21 is an example network scenario depicting transfer of UPF sessions from the first UPF to the second UPF when there are one or more additional intermediate user plane functions present between the PDU session anchor UPF and the first UPF and between the first UPF and access network. The first UPF is directly connected to intermediate UPFs (second network function and third network function) in this scenario.

FIG. 22 is an example call flow diagram for the scenario depicted in FIG. 21. Call flow details for example call flow in FIG. 16 may be the same as described for example call flow depicted in FIG. 20.

In an example embodiment, a session management function (SMF) may receive from a first network function, at least one indication for a first user plane function (UPF). The SMF may determine based on the at least one indication, to transfer a plurality of sessions of the first UPF. In an example, the plurality of sessions may be sessions of a plurality of wireless devices.

In an example, the SMF may send to a second UPF, a first message. The first message may indicate an establishment request of the plurality of sessions. The first message may comprise session identifiers of the plurality of sessions.

In an example, the SMF may receive from the second UPF, a second message indicating a result of the establishment request.

In an example, the SMF may send to the first UPF, a third message indicating release of at least one of the plurality of sessions. The third session may comprise the session identifiers of the plurality of sessions.

The SMF may receive from the first UPF, a fourth message indicating a response of the third message.

In an example, the first network function may comprise the first UPF, an operation and maintenance function, a policy control function (PCF), and/or the like.

In an example, one indication may comprise a first parameter indicating a request for transferring sessions of one or more UPFs. The first parameter may comprise a UPF identifier of the first UPF, the session identifiers of the plurality of sessions, location information of the first UPF, a data network name of the first UPF, a packet data unit session type of the plurality of sessions, a quality of service, a fully qualified connection set identifier, a single network slice selection assistance information of the plurality of sessions, a data network access identifier of the first UPF, and/or the like.

In an example, one indication may comprise a second parameter comprising traffic load information of one or more sessions of the first UPF. The traffic load information may comprise a session identifier, a fully qualified connection set identifier, a usage report, an error indication report, load control information, overload control information, an additional usage reports information, and/or the like.

In an example, one indication may comprise a third parameter comprising node information of the first UPF. The node information may comprise a node identifier, a fully qualified connection set identifier, a node report type, a user plane path failure report, a usage report for sessions, an overload report and/or the like.

In an example, the second message may comprise an uplink fully qualified tunnel endpoint identifiers (F-TEIDs) for the plurality of sessions, downlink F-TEIDs for the plurality of sessions, and/or the like.

In an example, the SMF may send a fifth message to a second network function indicating modification of at least one of the plurality of sessions. The fifth message may comprise the downlink F-TEIDs of the second UPF for the plurality of sessions.

In an example, the SMF may receive a sixth message in response to the fifth message from the second network function. The sixth message may comprise uplink F-TEIDs of the second network function for the plurality of sessions, and/or the like.

The second network function may comprise an egress network function, a packet data unit (PDU) session anchor UPF, and/or the like.

In an example, the SMF may send to a second network function, a fifth message indicating modification of at least one of the plurality of sessions. The third session may comprise the downlink F-TEIDs of the second UPF for the plurality of sessions, and/or the like.

In an example, the SMF may send a seventh message to a third network function indicating modification of at least one of the plurality of sessions. The seventh message may comprise the uplink F-TEIDs of the second UPF for the plurality of sessions.

In an example, the SMF may receive an eighth message in response to the seventh message from the third network function. The eighth message may comprise downlink F-TEIDs of the third network function for the plurality of sessions, and/or the like.

The third network function may comprise an ingress network function, an access network, and/or the like.

In an example, the plurality of sessions may comprise at least one first session of a first wireless device, at least one second session of a second wireless device, and/or the like.

In an example, the SMF may send a ninth message to the second UPF indicating modification of at least one of the plurality of sessions. The ninth message may comprise the uplink F-TEIDs of the second network function for the plurality of sessions, downlink F-TEIDs of the second network function for the plurality of sessions, and/or the like.

In an example, the SMF may receive a tenth message in response to the ninth message from the second UPF for the plurality of sessions.

In an example, the SMF may receive the result of the first message from the second UPF indicating that establishment of one or more sessions of the plurality of sessions is failed.

In an example, the SMF may send an eleventh message to a fourth network function indicating modification of at least one of the plurality of sessions. The eleventh message may comprise the uplink F-TEIDs of the second UPF for the plurality of sessions.

In an example, the SMF may receive a twelfth message in response to the eleventh message. The twelfth message may comprise downlink F-TEIDs of the fifth network function for the plurality of sessions, and/or the like.

In an example, the fourth network function may send a thirteenth message to a fifth network function indicating modification of at least one of the plurality of sessions. The thirteenth message may comprise the uplink F-TEIDs of the second UPF for the plurality of sessions.

In an example, the SMF may receive a twelfth message in response to the thirteenth message. The twelfth message may comprise downlink F-TEIDs of the fifth network function for the plurality of sessions, and/or the like.

The fourth network function may comprise at least one of an access and mobility management function (AMF).

The fifth network function may comprise at least one of an access network.

In an example embodiment, a session management function (SMF) may receive from a first network function, at least one indication for a first user plane function (UPF). The SMF may determine based on the at least one indication, to transfer at least one session of the first UPF. In an example, the at least one session may be sessions of a wireless device.

In an example, the SMF may send to a second UPF, a first message. The first message may indicate an establishment request of the at least one session. The first message may comprise session identifiers of the at least one session.

In an example, the SMF may receive from the second UPF, a second message indicating a result of the establishment request.

In an example, the SMF may send to the first UPF, a third message indicating release of at least one session. The third session may comprise the session identifiers of the at least one session.

The SMF may receive from the first UPF, a fourth message indicating a response of the third message.

In an example, the first network function may comprise the first UPF, an operation and maintenance function, a policy control function (PCF), and/or the like.

In an example, one indication may comprise a first parameter indicating a request for transferring sessions of one or more UPFs. The first parameter may comprise a UPF identifier of the first UPF, the session identifier of the at least one session, location information of the first UPF, a data network name of the first UPF, a packet data unit session type of the at least one session, a quality of service, a fully qualified connection set identifier, a single network slice selection assistance information of the at least one session, a data network access identifier of the first UPF, and/or the like.

In an example, one indication may comprise a second parameter comprising traffic load information of one or more sessions of the first UPF. The traffic load information may comprise a session identifier, a fully qualified connection set identifier, a usage report, an error indication report, load control information, overload control information, an additional usage reports information, and/or the like.

In an example, one indication may comprise a third parameter comprising node information of the first UPF. The node information may comprise a node identifier, a fully qualified connection set identifier, a node report type, a user plane path failure report, a usage report for sessions, an overload report and/or the like.

In an example, the second message may comprise an uplink fully qualified tunnel endpoint identifiers (F-TEIDs) for at least one session, downlink F-TEIDs for the at least one session, and/or the like.

In an example, the SMF may send a fifth message to a second network function indicating modification of at least one session. The fifth message may comprise the downlink F-TEIDs of the second UPF for the at least one session.

In an example, the SMF may receive a sixth message in response to the fifth message from the second network function. The sixth message may comprise uplink F-TEIDs of the second network function for the at least one session, and/or the like.

The second network function may comprise an egress network function, a packet data unit (PDU) session anchor UPF, and/or the like.

In an example, the SMF may send to a second network function, a fifth message indicating modification of at least the session. The third session may comprise the downlink F-TEIDs of the second UPF for the at least one session, and/or the like.

In an example, the SMF may send a seventh message to a third network function indicating modification of at least one session. The seventh message may comprise the uplink F-TEIDs of the second UPF for the at least one session.

In an example, the SMF may receive an eighth message in response to the seventh message from the third network function. The eighth message may comprise downlink F-TEIDs of the third network function for the at least one session, and/or the like.

The third network function may comprise an ingress network function, an access network, and/or the like.

In an example, the SMF may send a ninth message to the second UPF indicating modification of the at least one session. The ninth message may comprise the uplink F-TEIDs of the second network function for the at least one session, downlink F-TEIDs of the second network function for the at least one session, and/or the like.

In an example, the SMF may receive a tenth message in response to the ninth message from the second UPF for the at least one session.

In an example, the SMF may receive the result of the first message from the second UPF indicating that establishment of one or more sessions of the at least one session is failed.

In an example, the SMF may send an eleventh message to a fourth network function indicating modification of at least one session. The eleventh message may comprise the uplink F-TEIDs of the second UPF for the at least one session.

In an example, the SMF may receive a twelfth message in response to the eleventh message. The twelfth message may comprise downlink F-TEIDs of the fifth network function for the at least one session, and/or the like.

In an example, the fourth network function may send a thirteenth message to a fifth network function indicating modification of at least one session. The thirteenth message may comprise the uplink F-TEIDs of the second UPF for the at least one session.

In an example, the SMF may receive a twelfth message in response to the thirteenth message. The twelfth message may comprise downlink F-TEIDs of the fifth network function for the at least one session, and/or the like.

The fourth network function may comprise at least one of an access and mobility management function (AMF).

The fifth network function may comprise at least one of an access network.

In an example, a first user plane function may receive at least one indication from a first network function for transfer of the plurality of sessions.

In an example, the first UPF may send a first transfer message to an SMF. The first transfer message may comprise session identifiers of the plurality of sessions to be transferred, an identifier of a second UPF, and/or the like.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 25:
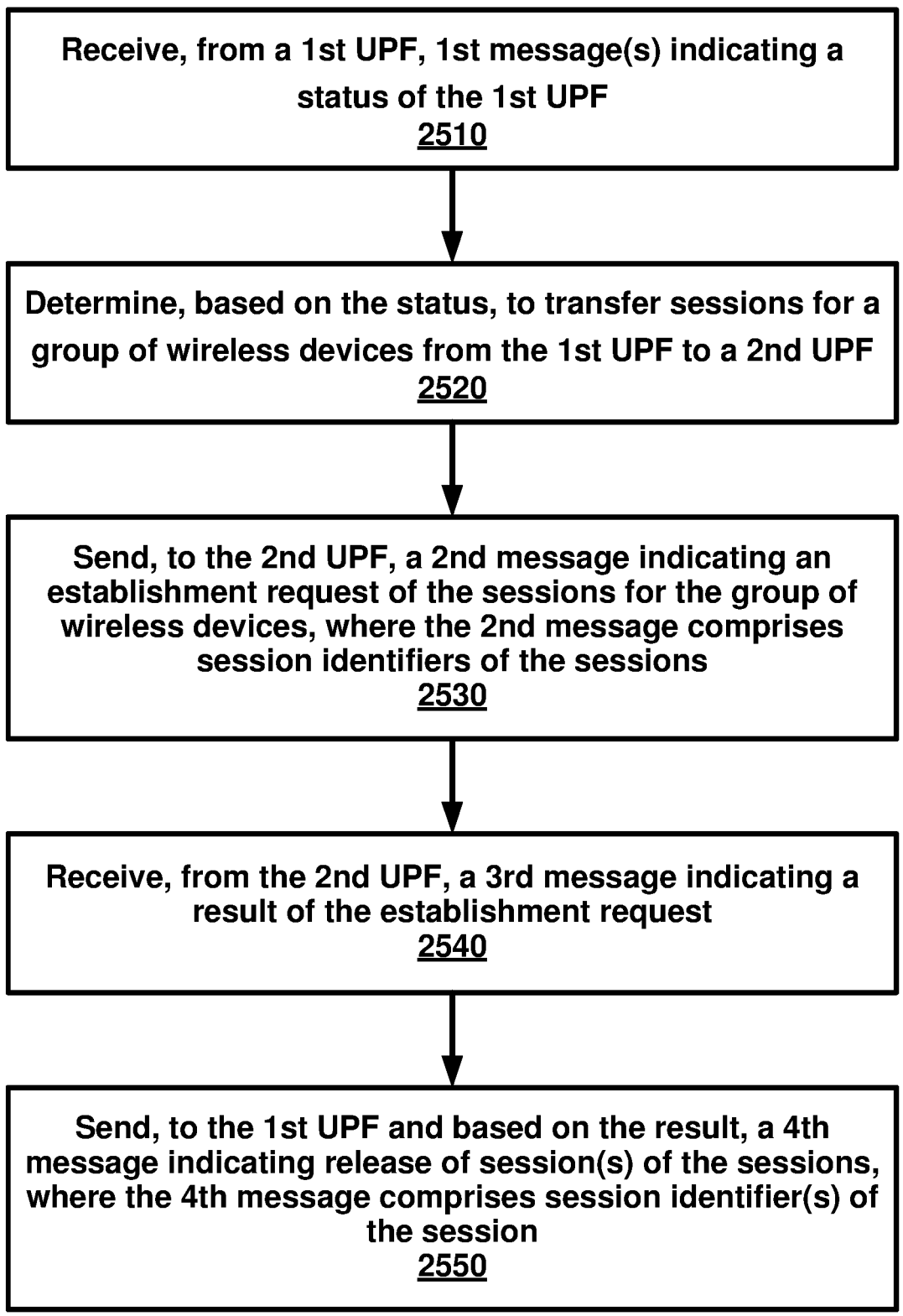
FIG. 25 is a flow diagram of an aspect of an example embodiment of the present disclosure.

FIG. 25 is an flow diagram as per an aspect of an example embodiment of the present disclosure. At 2510, a session management function (SMF) may receive at least one first message from a first user plane function (UPF). The at least one first message may indicate a status of the first UPF. At 2520, the SMF may determine, based on the status, to transfer a plurality of sessions for a group of wireless devices from the first UPF to a second UPF. At 2530, the SMF may send a second message to the second UPF. The second message may indicate an establishment request of the plurality of sessions for the group of wireless devices. The second message may comprise session identifiers of the plurality of sessions. At 2540, the SMF may receive a third message from the second UPF. The third message may indicate a result of the establishment request. At 2550, the SMF may send a fourth message to the first UPF based on the result. The fourth message may indicate release of at least one session of the plurality of sessions. The fourth message may comprise at least one session identifier of the at least one session.

According to an example embodiment, the SMF may receive a fifth message from the first UPF. The fifth message may indicate a response to the fourth message. According to an example embodiment, the SMF may receive the at least one first message from a first network function. The at least one first message may indicate a status of the first UPF. The first network function may comprise an operation and maintenance function. The first network function may comprise a policy control function. According to an example embodiment, the first message may comprise a first parameter indicating a request for transferring sessions of one or more UPFs. The first parameter may comprise a UPF identifier of the first UPF. The first parameter may comprise the session identifiers of the plurality of sessions. The first parameter may comprise location information of the first UPF. The first parameter may comprise a data network name of the first UPF. The first parameter may comprise a packet data unit session type of the plurality of sessions. The first parameter may comprise a quality of service. The first parameter may comprise a fully qualified connection set identifier. The first parameter may comprise a single network slice selection assistance information of the plurality of sessions. The first parameter may comprise a data network access identifier of the first UPF. According to an example embodiment, the first message may comprise a second parameter comprising traffic load information of one or more sessions of the first UPF. The traffic load information may comprise a session identifier. The traffic load information may comprise a fully qualified connection set identifier. The traffic load information may comprise a usage report. The traffic load information may comprise an error indication report. The traffic load information may comprise load control information. The traffic load information may comprise overload control information. The traffic load information may comprise an additional usage reports information. According to an example embodiment, the first message may comprise a third parameter comprising node information of the first UPF. The node information may comprise a node identifier. The node information may comprise a fully qualified connection set identifier. The node information may comprise a node report type. The node information may comprise a user plane path failure report. The node information may comprise a usage report for sessions. The node information may comprise an overload report. According to an example embodiment, the third message may comprise uplink fully qualified tunnel endpoint identifiers for the plurality of sessions According to an example embodiment, the third message may comprise downlink fully qualified tunnel endpoint identifiers for the plurality of sessions.

According to an example embodiment, the SMF may send a fifth message to a second network function. The fifth message may comprise downlink fully qualified tunnel endpoint identifiers of the second UPF for the plurality of sessions. According to an example embodiment, in response to the fifth message, the SMF may receive a sixth message from the second network function. The sixth message may comprise uplink fully qualified tunnel endpoint identifiers of the second network function for the plurality of sessions. According to an example embodiment, the second network function may comprise a packet data unit session anchor user plan function. According to an example embodiment, the second network function may comprise an egress network function. The egress network function may be an intermediate UPF and/or PDU session anchor UPF. According to an example embodiment, the SMF may send a fifth message to a third network function. The fifth message may comprise uplink fully qualified tunnel endpoint identifiers of the second UPF for the plurality of sessions. According to an example embodiment, in response to the fifth message, the SMF may receive a sixth message from the third network function. The sixth message may comprise downlink fully qualified tunnel endpoint identifiers of the third network function for the plurality of sessions. According to an example embodiment, the third network function may comprise an ingress network function. According to an example embodiment, the third network function may comprise the ingress network function being an intermediate UPF.

According to an example embodiment, the plurality of sessions may comprise at least one first session of a first wireless device. According to an example embodiment, the plurality of sessions may comprise at least one second session of a second wireless device. According to an example embodiment, the SMF may send a fifth message to the second UPF. The fifth message may comprise an uplink fully qualified tunnel endpoint identifier of a second network function for the plurality of sessions. The fifth message may comprise a downlink fully qualified tunnel endpoint identifier of a third network function for the plurality of sessions. According to an example embodiment, in response to the fifth message the SMF may receive a sixth message from the second UPF. The sixth message may be for the plurality of sessions. According to an example embodiment, the result may indicate that establishment of one or more sessions of the plurality of sessions failed.

According to an example embodiment, the SMF may send a fifth message to a fourth network function. The fifth message may comprise uplink fully qualified tunnel endpoint identifiers of the second UPF for the plurality of sessions. According to an example embodiment, in response to the fifth message, the SMF may receive sixth message from the fourth network function. The sixth message may comprise a downlink fully qualified tunnel endpoint identifier of a fifth network function for the plurality of sessions. According to an example embodiment, the fourth network function may send a seventh message to the fifth network function. The seventh message may comprise uplink fully qualified tunnel endpoint identifiers of the second UPF for the plurality of sessions. According to an example embodiment, in response to the seventh message, the fourth network function may receive a eight message from the fifth network function. The eight message may comprise downlink fully qualified tunnel endpoint identifiers of the fifth network function for the plurality of sessions. According to an example embodiment, the fourth network function may comprise an access and mobility management function. According to an example embodiment, the fifth network function may comprise at least one access network. According to an example embodiment, the SMF may receive a fifth message from a unified data management function. According to an example embodiment, the SMF may receive a fifth message from a policy control function. The fifth message may comprise transfer priority information. According to an example embodiment, the SMF may employ transfer priority information to transfer the plurality of sessions from the first UPF to a second UPF.

In this specification, a and an and similar phrases are to be interpreted as at least one and one or more. In this specification, the term may is to be interpreted as may, for example. In other words, the term may indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
receiving, by a session management function (SMF) from a first user plane function (UPF), at least one first message indicating a status of the first UPF;
determining, by the SMF and based on the status, to transfer a plurality of sessions for a plurality of wireless devices from the first UPF to a second UPF;
sending, by the SMF to the second UPF, a second message indicating an establishment request of the plurality of sessions for the plurality of wireless devices, wherein the second message comprises session identifiers of the plurality of sessions;
receiving, by the SMF from the second UPF, a third message indicating a result of the establishment request; and
sending, by the SMF to the first UPF and based on the result, a fourth message indicating release of at least one session of the plurality of sessions, wherein the fourth message comprises at least one session identifier of the at least one session.

2. The method of claim 1, further comprising receiving, by the SMF from the first UPF, a fifth message indicating a response to the fourth message.

3. The method of claim 1, further comprising receiving, by the SMF from a first network function, the at least one first message indicating a status of the first UPF, wherein the first network function comprises at least one of:
- an operation and maintenance function; or
- a policy control function.

4. The method of claim 1, wherein the first message further comprises a first parameter indicating a request for transferring sessions of one or more UPFs, wherein the first parameter comprises at least one of:
- a UPF identifier of the first UPF;
- the session identifiers of the plurality of sessions;
- location information of the first UPF;
- a data network name of the first UPF;
- a packet data unit session type of the plurality of sessions;
- a quality of service;
- a fully qualified connection set identifier;
- a single network slice selection assistance information of the plurality of sessions; or
- a data network access identifier of the first UPF.

5. The method of claim 1, wherein the first message further comprises a second parameter comprising traffic load information of one or more sessions of the first UPF, wherein the traffic load information comprises at least one of:
- a session identifier;
- a fully qualified connection set identifier;
- a usage report;
- an error indication report;
- load control information;
- overload control information; or
- an additional usage reports information.

6. The method of claim 1, wherein the first message further comprises a third parameter comprising node information of the first UPF, wherein the node information comprises at least one of:
- a node identifier;
- a fully qualified connection set identifier;
- a node report type;
- a user plane path failure report;
- a usage report for sessions; or
- an overload report.

7. The method of claim 1, wherein the third message comprises at least one of:
- uplink fully qualified tunnel endpoint identifiers for the plurality of sessions; or
- downlink fully qualified tunnel endpoint identifiers for the plurality of sessions.

8. The method of claim 1, further comprising sending, by the SMF to a second network function, a fifth message comprising downlink fully qualified tunnel endpoint identifiers of the second UPF for the plurality of sessions.

9. The method of claim 8, further comprising receiving, by the SMF from the second network function and in response to the fifth message, a sixth message comprising uplink fully qualified tunnel endpoint identifiers of the second network function for the plurality of sessions.

10. The method of claim 8, wherein the second network function comprises at least one of:
- a packet data unit session anchor user plan function; or
- an egress network function, wherein the egress network function is an intermediate UPF and/or PDU session anchor UPF.

11. The method of claim 1, further comprising:
- sending, by the SMF to a third network function, a fifth message comprising uplink fully qualified tunnel endpoint identifiers of the second UPF for the plurality of sessions; and
- receiving, by the SMF from the third network function and in response to the fifth message, a sixth message comprising downlink fully qualified tunnel endpoint identifiers of the third network function for the plurality of sessions.

12. The method of claim 11, wherein the third network function comprises at least one of an ingress network function, and the ingress network function being an intermediate UPF.

13. The method of claim 1, wherein the plurality of sessions comprises:
- at least one first session of a first wireless device; and
- at least one second session of a second wireless device.

14. The method of claim 1, further comprising:
- sending, by the SMF to the second UPF, a fifth message comprising:
  - an uplink fully qualified tunnel endpoint identifier of a second network function for the plurality of sessions; and
  - a downlink fully qualified tunnel endpoint identifier of a third network function for the plurality of sessions; and
- receiving, by the SMF from the second UPF and in response to the fifth message, a sixth message for the plurality of sessions.

15. The method of claim 1, wherein the result indicates that establishment of one or more sessions of the plurality of sessions failed.

16. The method of claim 1, further comprising:
- sending, by the SMF to a fourth network function, a fifth message comprising uplink fully qualified tunnel endpoint identifiers of the second UPF for the plurality of sessions; and
- receiving, by the SMF from the fourth network function and in response to the fifth message, a sixth message comprising a downlink fully qualified tunnel endpoint identifier of a fifth network function for the plurality of sessions.

17. The method of claim 16, further comprising:
- sending, by the fourth network function to the fifth network function, a seventh message comprising uplink fully qualified tunnel endpoint identifiers of the second UPF for the plurality of sessions; and
- receiving, by the fourth network function from the fifth network function and in response to the seventh message, a eight message comprising downlink fully qualified tunnel endpoint identifiers of the fifth network function for the plurality of sessions.

18. The method of claim 17, wherein the fourth network function comprises an access and mobility management function.

19. The method of claim 18, wherein the fifth network function comprises at least one access network.

20. The method of claim 1, further comprising:
- receiving, by the SMF from a unified data management and/or a policy control function, a fifth message comprising transfer priority information; and
- employing, by the SMF, the transfer priority information to transfer the plurality of sessions from the first UPF to a second UPF.

* * * * *